(12) United States Patent
Doerksen

(10) Patent No.: US 11,479,311 B2
(45) Date of Patent: Oct. 25, 2022

(54) SELF-BALANCING SYSTEMS FOR ELECTRIC VEHICLES

(71) Applicant: Future Motion, Inc., Santa Cruz, CA (US)

(72) Inventor: Kyle Jonathan Doerksen, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 155 days.

(21) Appl. No.: 16/736,685

(22) Filed: Jan. 7, 2020

(65) Prior Publication Data
US 2020/0216128 A1 Jul. 9, 2020

Related U.S. Application Data

(60) Provisional application No. 62/789,321, filed on Jan. 7, 2019.

(51) Int. Cl.
*B62D 61/00* (2006.01)
*A63C 17/08* (2006.01)
(Continued)

(52) U.S. Cl.
CPC .............. *B62D 61/00* (2013.01); *A63C 17/08* (2013.01); *B60G 13/003* (2013.01);
(Continued)

(58) Field of Classification Search
CPC ......... B62D 61/00; A63C 17/08; A63C 17/12; A63C 17/014; A63C 2203/24; A63C 2203/12; A63C 2203/18
See application file for complete search history.

(56) References Cited

U.S. PATENT DOCUMENTS 1,585,258 A 5/1926 Moore
4,023,864 A 5/1977 Lang
(Continued)

FOREIGN PATENT DOCUMENTS

| KR | 10-2014-0093022 A | 7/2014 |
|----|-------------------|--------|
| TW | 450823 B | 8/2001 |
| WO | 2009/071879 A9 | 6/2009 |

OTHER PUBLICATIONS

U.S. Receiving Office, International Search Report and Written Opinion of the International Searching Authority, dated May 7, 2020, in PCT/US2020/012620, which is the international application which shares the same priority as this U.S. application.

*Primary Examiner* — Frank B Vanaman
(74) *Attorney, Agent, or Firm* — Kolitch Romano LLP

(57) ABSTRACT

An electric vehicle includes a lateral self-stabilization system and may further include a fore-aft self-stabilization system. The lateral self-stabilization system may include a controller configured to cause an actuator to laterally tilt a frame of the vehicle based on sensed information relating to an orientation of the vehicle, or portion thereof, about a roll axis. The frame of the vehicle may include any suitable structure configured to be laterally tilted by the actuator relative to an axle of the vehicle. The fore-aft stabilization system may include a motor controller configured to drive a motor of the vehicle based on sensed information relating to a pitch angle of the vehicle. In some examples, the vehicle is a robotic vehicle.

15 Claims, 17 Drawing Sheets

(51) Int. Cl.
  *B60K 7/00*       (2006.01)
  *B60G 13/00*      (2006.01)
  *A63C 17/12*          (2006.01)
  *A63C 17/01*          (2006.01)

(52) U.S. Cl.
  CPC .......... *B60G 13/005* (2013.01); *B60K 7/0007* (2013.01); *A63C 17/014* (2013.01); *A63C 17/12* (2013.01); *B60G 2202/43* (2013.01); *B60G 2800/014* (2013.01)

(56)  References Cited

U.S. PATENT DOCUMENTS

| | | |
|---|---|---|
| 4,106,786 A | 8/1978 | Talbott |
| 4,109,741 A | 8/1978 | Gabriel |
| 4,795,181 A | 1/1989 | Armstrong |
| 4,997,196 A | 3/1991 | Wood |
| 5,119,277 A | 6/1992 | Copley |
| 5,132,883 A | 7/1992 | La Lumandier |
| 5,487,441 A | 1/1996 | Endo |
| 5,513,080 A | 4/1996 | Magle |
| 5,794,730 A | 8/1998 | Kamen |
| 5,857,535 A * | 1/1999 | Brooks .................... B60N 2/39 180/41 |
| 6,050,357 A | 4/2000 | Staelin |
| 6,223,104 B1 | 4/2001 | Kamen |
| 6,242,701 B1 | 6/2001 | Breed |
| 6,288,505 B1 | 9/2001 | Heinzmann |
| 6,332,103 B1 | 12/2001 | Steenson, Jr. |
| 6,408,240 B1 | 6/2002 | Morrell |
| 6,536,788 B1 | 3/2003 | Kuncz |
| 6,538,411 B1 | 3/2003 | Field |
| 6,553,271 B1 | 4/2003 | Morrell |
| 6,561,294 B1 | 5/2003 | Kamen |
| 6,779,621 B2 | 8/2004 | Kamen |
| 6,789,640 B1 | 9/2004 | Arling |
| 6,827,163 B2 | 12/2004 | Amsbury |
| 6,874,591 B2 | 4/2005 | Morrell |
| 6,965,206 B2 | 11/2005 | Kamen |
| 6,992,452 B1 | 1/2006 | Sachs |
| 7,023,330 B2 | 4/2006 | Kamen |
| 7,053,289 B2 | 5/2006 | Iwai |
| 7,090,040 B2 | 8/2006 | Kamen |
| 7,091,724 B2 | 8/2006 | Heinzmann |
| 7,130,702 B2 | 10/2006 | Morrell |
| 7,138,774 B2 | 11/2006 | Negoro |
| 7,157,875 B2 | 1/2007 | Kamen |
| 7,172,044 B2 | 2/2007 | Bouvet |
| 7,178,614 B2 * | 2/2007 | Ishii ........................ B60K 1/02 180/7.1 |
| 7,198,280 B2 | 4/2007 | Hara |
| 7,263,453 B1 | 8/2007 | Gansler |
| D551,592 S | 9/2007 | Chang |
| 7,424,927 B2 | 9/2008 | Hiramatsu |
| 7,427,927 B2 | 9/2008 | Borleske |
| 7,467,681 B2 | 12/2008 | Hiramatsu |
| 7,467,891 B2 | 12/2008 | Gennissen |
| 7,479,097 B2 | 1/2009 | Rosborough |
| 7,740,099 B2 | 6/2010 | Field |
| 7,757,794 B2 | 7/2010 | Heinzmann |
| 7,789,174 B2 | 9/2010 | Kamen |
| 7,811,217 B2 | 10/2010 | Odien |
| 7,857,088 B2 | 12/2010 | Field |
| 7,900,725 B2 | 3/2011 | Heinzmann |
| 7,962,256 B2 | 6/2011 | Stevens |
| 7,963,352 B2 | 6/2011 | Alexander |
| 7,979,179 B2 | 7/2011 | Gansler |
| 8,052,293 B2 | 11/2011 | Hurwitz |
| 8,083,313 B2 | 12/2011 | Karppinen |
| 8,146,696 B2 | 4/2012 | Kaufman |
| 8,170,780 B2 | 5/2012 | Field |
| 8,467,941 B2 | 6/2013 | Field |
| 8,490,723 B2 | 7/2013 | Heinzmann |
| 8,562,386 B2 | 10/2013 | Carlson |
| 8,682,487 B2 | 3/2014 | Kurth |
| 9,101,817 B2 | 8/2015 | Doerksen |
| D746,928 S | 1/2016 | Doerksen |
| 9,400,505 B2 | 7/2016 | Doerksen |
| 9,452,345 B2 | 9/2016 | Doerksen |
| D768,252 S | 10/2016 | Bigler |
| D769,997 S | 10/2016 | Doerksen |
| 9,598,141 B1 | 3/2017 | Doerksen |
| 9,802,109 B2 | 10/2017 | Doerksen |
| 10,010,784 B1 | 7/2018 | Doerksen |
| 2002/0063006 A1 * | 5/2002 | Kamen .................. A63C 17/08 180/171 |
| 2006/0038520 A1 | 2/2006 | Negoro |
| 2006/0049595 A1 | 3/2006 | Crigler |
| 2006/0170174 A1 | 8/2006 | Hiramatsu |
| 2006/0260862 A1 | 11/2006 | Nishikawa |
| 2007/0194558 A1 | 8/2007 | Stone |
| 2007/0254789 A1 | 11/2007 | Odien |
| 2008/0242515 A1 * | 10/2008 | Odien ................ A63B 21/0058 482/34 |
| 2010/0219011 A1 * | 9/2010 | Shimoyama ........... B62D 37/04 180/218 |
| 2011/0276233 A1 * | 11/2011 | Lofstrand ............... B60N 2/062 701/49 |
| 2011/0309772 A1 | 12/2011 | Forgey |
| 2012/0232734 A1 | 9/2012 | Pelletier |
| 2013/0081891 A1 | 4/2013 | Ulmen |
| 2013/0175943 A1 | 7/2013 | Tackett |
| 2014/0316661 A1 | 10/2014 | Parker |
| 2015/0107922 A1 | 4/2015 | Bigler |
| 2018/0057050 A1 * | 3/2018 | Takenaka ............... B62D 6/002 |
| 2018/0194425 A1 | 7/2018 | Doerksen |

* cited by examiner

SELF-BALANCING SYSTEMS FOR ELECTRIC VEHICLES

CROSS-REFERENCES

This application claims the benefit under 35 U.S.C. § 119(e) of the priority of U.S. Provisional Patent Application Ser. No. 62/789,321, filed Jan. 7, 2019, the entirety of which is hereby incorporated by reference for all purposes.

FIELD

This disclosure relates to systems and methods for electric vehicles. More specifically, the disclosed embodiments relate to mechanical and control systems and methods for one-wheeled electric vehicles.

SUMMARY

The present disclosure provides systems, apparatuses, and methods relating to self-balancing electric vehicles.

In some embodiments, a self-balancing electric vehicle may include a wheel having an axle coupled to a body of the vehicle by a mechanical linkage, wherein the body of the vehicle is tiltable about a pitch axis coaxial with the axle of the wheel; wherein the body of the vehicle is tiltable with respect to the wheel axle about a roll axis orthogonal to the pitch axis; an actuator coupled to the mechanical linkage; a hub motor configured to drive the wheel; one or more orientation sensors coupled to the vehicle; and a motor controller configured to receive, from the one or more orientation sensors, first orientation information indicating a pitch orientation of the body with respect to the pitch axis and second orientation information indicating a roll orientation of the body with respect to the roll axis, to cause the hub motor to propel the vehicle based on the first orientation information, and to cause the tilt actuator to adjust the orientation of the body based on the second orientation information.

In some embodiments, a method of balancing a vehicle having only a single wheel may include measuring first orientation information of a body of the vehicle indicating a pitch orientation of the body with respect to a rotation axis of the single wheel of the vehicle, wherein the body is coupled to the wheel by a mechanical linkage; measuring second orientation information of the body indicating a roll orientation of the body with respect to a lateral tilting axis orthogonal to the rotation axis of the wheel; controlling a motor coupled to the wheel to propel the vehicle based on the first orientation information; and using an actuator of the mechanical linkage to tilt the body in response to the second orientation information.

Features, functions, and advantages may be achieved independently in various embodiments of the present disclosure, or may be combined in yet other embodiments, further details of which can be seen with reference to the following description and drawings.

DETAILED DESCRIPTION

Figure 1:
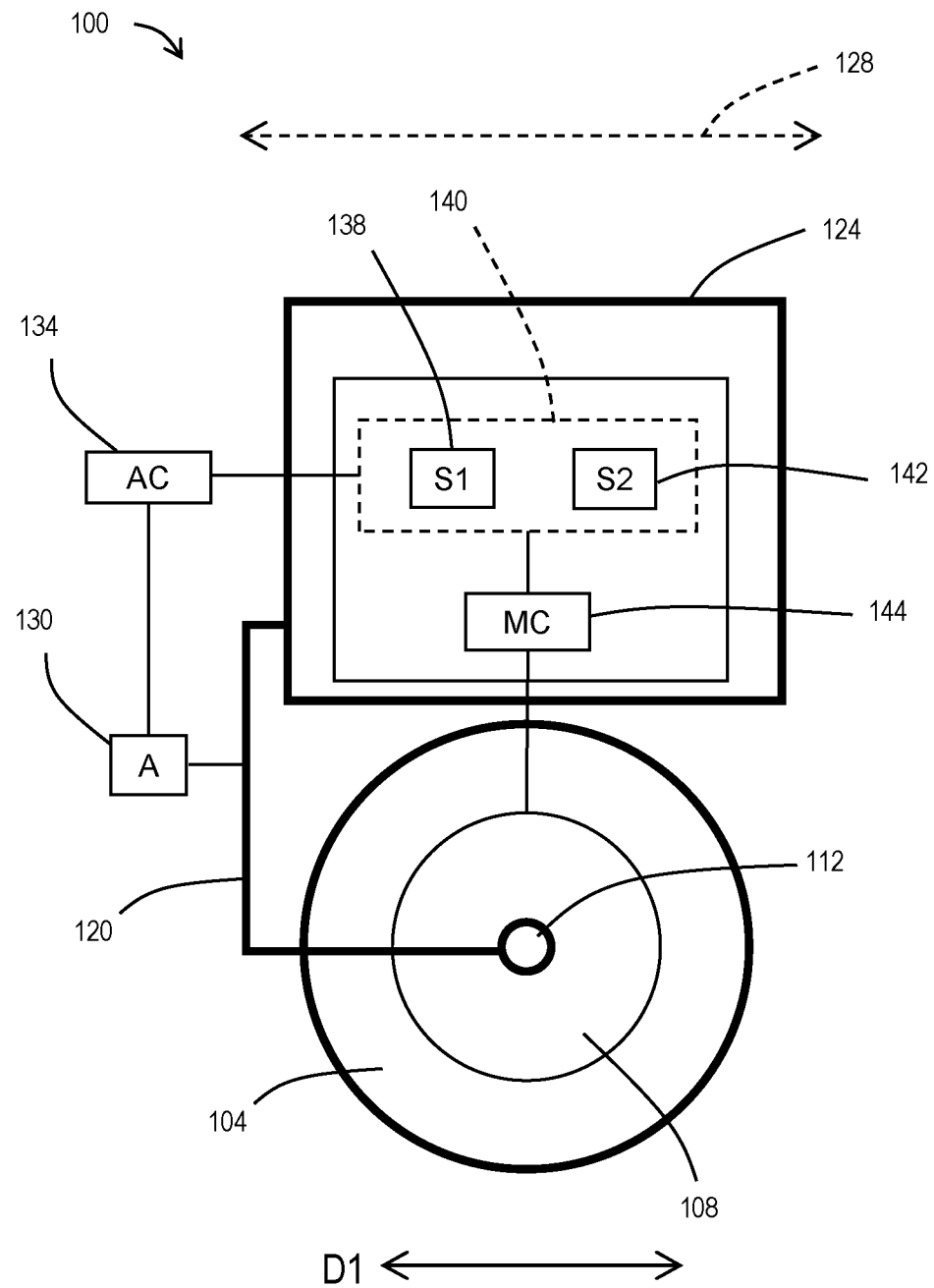
FIG. 1 is a schematic side view of an illustrative self-balancing vehicle in accordance with aspects of the present teachings.

Various aspects and examples of one-wheeled vehicles having balance controls on one or two axes, as well as related methods, are described below and illustrated in the associated drawings. Unless otherwise specified, a one-wheeled vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware. A "controller" may include processing logic programmed with instructions to perform specialized computing operations, such as carrying out one or more of the motor control and/or tilt actuator-related processes and operations described herein.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a self-balancing electric vehicle in accordance with aspects of the present teachings is configured to automatically shift at least a portion of a frame of the vehicle in a manner that provides lateral stability (e.g., stability about a lateral tilt axis orthogonal to a rotation axis of the wheel). In some examples, the vehicle includes a frame coupled to an axle of the wheel by a linkage, and a controller configured to adjust the orientation of the frame about the lateral tilt axis (e.g., by controlling a linear or rotary actuator). The controller may be configured to provide lateral stability by adjusting the orientation of the frame, based on sensed orientation information, such that the vehicle's center of gravity is maintained over the wheel. Additionally, or alternatively, the controller may be configured to steer or assist in steering the vehicle by adjusting the orientation of the frame such that the vehicle is turned in a desired direction.

In some examples, the vehicle is configured to stabilize itself in a fore-aft direction (i.e., to be stabilized about the rotation axis of the wheel). For example, a motor controller may be configured to cause a motor of the vehicle to propel the vehicle based on sensed information indicating an orientation of the vehicle about the rotation axis. The motor controller configured to provide fore-aft stability may be the same controller that is configured to provide lateral stability, or it may be a separate controller.

A vehicle in accordance with aspects of the present teachings can comprise a robotic vehicle (AKA an autonomous vehicle) configured to be operated, completely or in part, without input from a human rider. Alternatively, or additionally, the vehicle of the present disclosure may be configured for non-autonomous operation (i.e., configured to be controlled by a rider, with automatic stabilization along one or more axes as described above). A robotic vehicle may, for example, be controlled by commands received from a remote controller, by commands computed and/or executed by an onboard controller, and/or by any other suitable data. The frame of a robotic vehicle may include one or more cargo compartments, and/or may be configured to carry camera(s), other suitable sensor(s), and/or display(s), and may or may not be configured to support a passenger. A non-autonomous vehicle, in contrast, is configured to support a rider and to be steered and/or propelled forward based on input from the rider, such as shifts in the rider's weight. Suitable components configured to support a rider may include one or more foot decks, seats, saddles, and/or the like.

In some examples, a robotic vehicle is configurable to selectively receive commands from a passenger, which may override or take the place of certain operations of the otherwise autonomous vehicle. For example, a robotic vehicle may be configured to receive commands from the passenger to slow or stop the vehicle, or to change the vehicle's destination. In some examples, a vehicle may be selectively operable in either a robotic mode or in a non-autonomous, rider-directed mode.

Illustrative autonomous and non-autonomous vehicles described herein primarily include vehicles having only one wheel, but vehicles of the present teachings may include any suitable number of wheels (e.g., two, three, four, or more wheels) and/or other suitable ground-contacting elements (e.g., tires, continuous track(s) and/or the like). Examples of suitable vehicles, frames, and actuation systems are described, without limitation, in the Examples, Components, and Alternatives section below.

Aspects of the control systems (e.g., lateral stability control systems, fore-aft stability control systems, and/or any other suitable control systems) described herein may be embodied as a computer method, computer system, or computer program product. Accordingly, aspects of the control systems may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the control systems may take the form of a computer program product embodied in a computer-readable medium (or media) having computer-readable program code/instructions embodied thereon.

Any suitable combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of control systems may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the control systems may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative self-balancing vehicles as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Vehicle

With reference to FIGS. 1-12, this section describes an illustrative vehicle 100 in accordance with aspects of the present teachings. Vehicle 100 is an example of an electric vehicle having self-balancing capabilities in at least a lateral direction, and optionally also in a fore-aft direction, as described above. Other illustrative vehicles which are examples of vehicle 100 are also described in this section.

Figure 2:
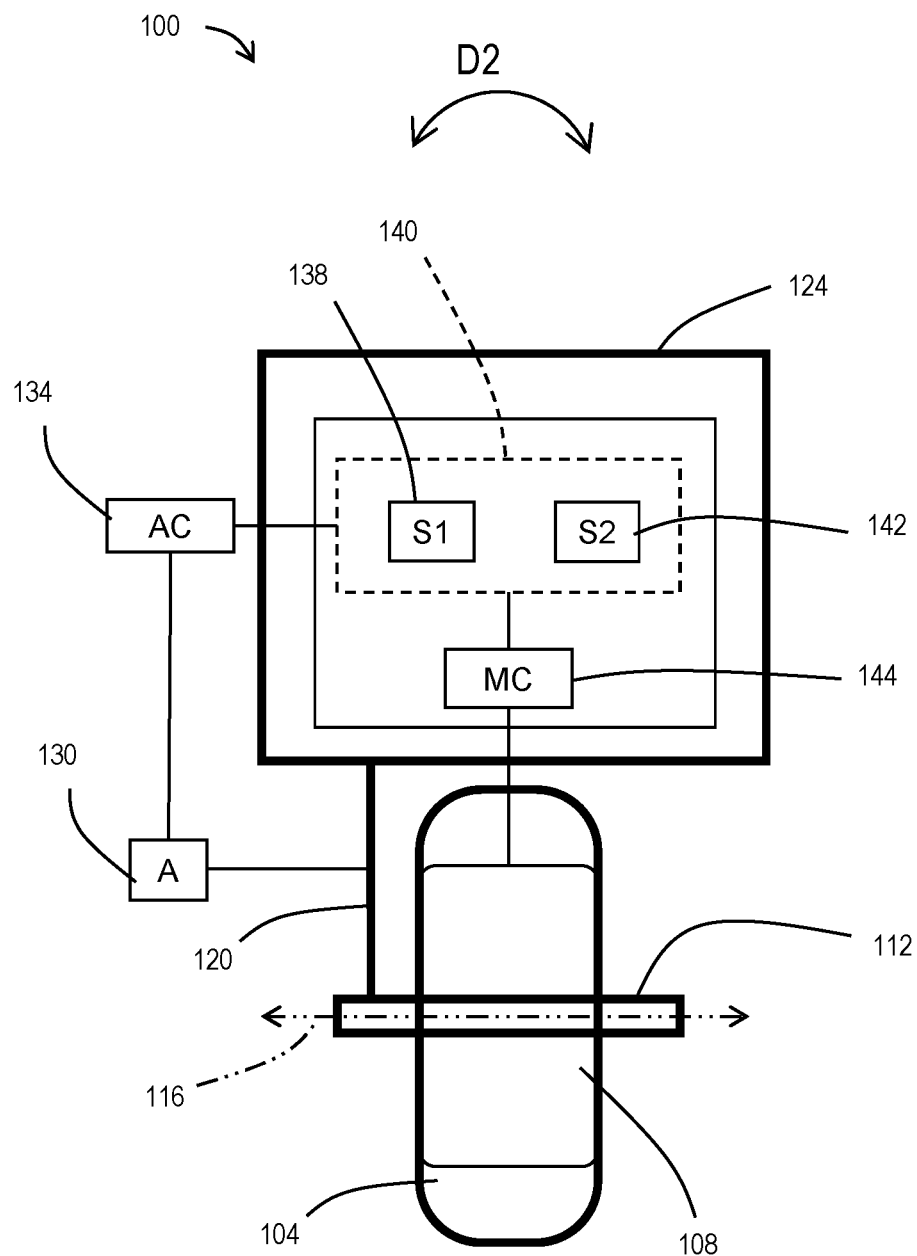
FIG. 2 is a schematic front view of the vehicle of FIG. 1.

FIG. 1 is a schematic side view of vehicle 100, and FIG. 2 is a schematic front view of the vehicle. As shown in FIGS. 1-2, vehicle 100 includes a single rotatable ground-contacting element 104 (e.g., a tire, wheel, or continuous track). In this example, vehicle 100 includes exactly one ground-contacting element, but other example vehicles may include a plurality of (e.g., coaxial) ground-contacting elements. For convenience, ground-contacting element 104 is hereinafter referred to as a tire or wheel, although other suitable embodiments may be provided.

Vehicle 100 further includes a motor assembly 108. Motor assembly 108 includes an electric motor, such as a hub motor and/or any other suitable motor, configured to rotate wheel 104 about an axle 112 (AKA a shaft) to propel vehicle 100 in a fore-aft direction indicated by arrow D1 in FIG. 1. This direction may also be referred to as a direction of travel and/or direction of vehicle travel.

Axle 112 defines a rotation axis 116 of wheel 104 and is coupled to a linkage 120 by any suitable mechanism (e.g., one or more axle mounts and/or one or more fasteners, such as a plurality of bolts). Linkage 120 couples axle 112 to a frame 124 such that the frame is tiltable in a side-to-side (AKA lateral) direction about a lateral tilt axis 128 orthogonal to rotation axis 116. The exact position of lateral tilt axis 128 varies based on the implementation of linkage 120 (e.g., based on the location (s) of pivot point(s) of the linkage). In general, lateral tilt axis 128 is parallel to the fore-aft direction defined by vehicle 100 and orthogonal to rotation axis 116. The lateral tilting direction is generally indicated by arrow D2 (see FIG. 2).

A lateral tilt actuator 130 is coupled to linkage 120 such that actuation of the lateral tilt actuator is configured to tilt frame 124 about lateral tilt axis 128. Actuator 130 may comprise any suitable device(s) configured to tilt the frame in this manner, including rotary actuator(s), linear actuator(s), and/or any other suitable device(s). Suitable examples may include torque motors, hydraulic or pneumatic cylinders, direct-drive motors, belts and chains, worm drives, lead screws, and the like.

Actuator 130 is in communication with an actuator controller 134, which is in communication with at least one orientation sensor 138. Orientation sensor 138 (AKA a lateral sensor and/or roll sensor) is configured to sense orientation information relating to stability of vehicle 100 in a generally lateral (AKA side-to-side) direction. Controller 134 is configured to receive the sensed orientation information from roll sensor 138 and to cause actuator 130 to adjust the orientation of frame 124 about lateral tilt axis 128 based on the orientation information. Actuator 130, controller 134, and roll sensor 138 may each be disposed at any suitable portion(s) of vehicle 100.

Roll sensor 138 may comprise any suitable sensor capable of sensing information indicating lateral tilting of the vehicle (also referred to as "roll"), such as one or more gyros, accelerometers, inertial measurement units (IMUs), and/or any other suitable sensor. In some examples, roll sensor 138 is part of a sensor assembly 140 also including a pitch sensor 142 configured to sense information relating to a pitch of vehicle 100 about wheel rotation axis 116, and/or any other suitable sensor(s). In some examples, pitch and roll may be sensed by a single device (e.g., a multi-axis accelerometer). One or more sensors of sensor assembly 140 may be in communication with a motor controller 144 configured to control motor assembly 108.

Controller 134 may comprise any suitable processing logic for receiving orientation information from roll sensor 138 and controlling actuator 130 to laterally stabilize vehicle 100. In some examples, actuator controller 134 and motor controller 144 are part of a same vehicle controller. Alternatively, or additionally, the functions of actuator controller 134 and motor controller 144 may be accomplished by a same controller circuit.

The lateral orientation information sensed by roll sensor 138 may comprise any suitable information usable by controller 134 to determine whether and/or how to stabilize the vehicle by causing actuator 130 to adjust an orientation of frame 124 about lateral tilt axis 128. For example, sensor 138 may sense whether vehicle 100 and/or any portion thereof has tilted such that a center of gravity of the vehicle is no longer positioned directly above a contact point (or patch) between wheel 104 and the ground. In some examples, sensor 138 directly senses the orientation (e.g., a tilt angle) of the vehicle or vehicle portion. Alternatively, or additionally, sensor 138 may sense information indirectly indicating the lateral orientation, and controller 134 may be configured to calculate, infer, look up, or otherwise obtain the orientation of frame 124 based on the sensed information.

Based on the sensed information, processing logic of controller 134 causes actuator 130 to adjust an orientation of frame 124 about lateral tilt axis 128 to move a center of gravity of the vehicle above the contact patch. In this manner, vehicle 100 is self-stabilized laterally, at least on average over time. This tends to prevent the vehicle from tipping over sideways, as it would without lateral stabilization.

Figure 3:
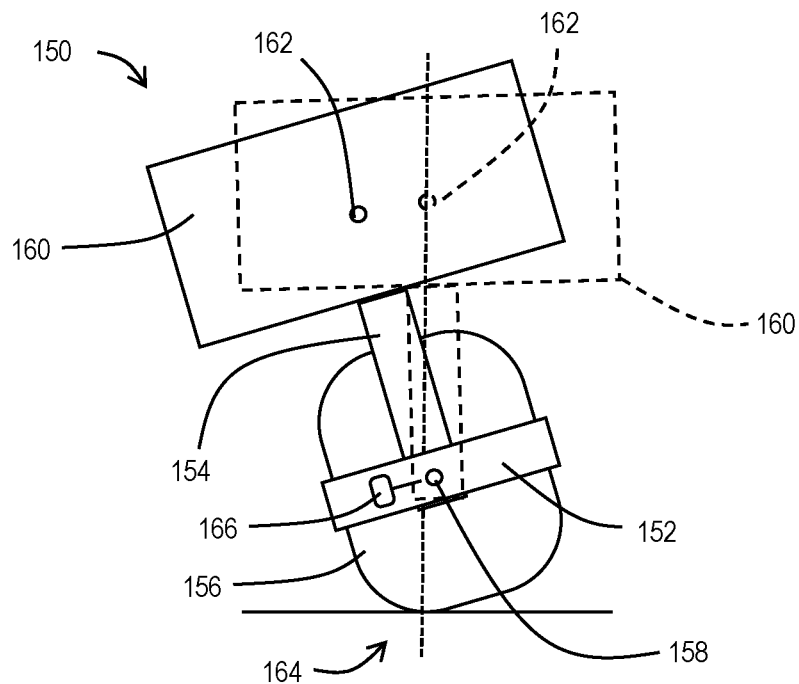
FIG. 3 is a schematic front view of another illustrative self-balancing vehicle in accordance with aspects of the present teachings, depicting the vehicle before and after stabilizing itself laterally.
Figure 4:
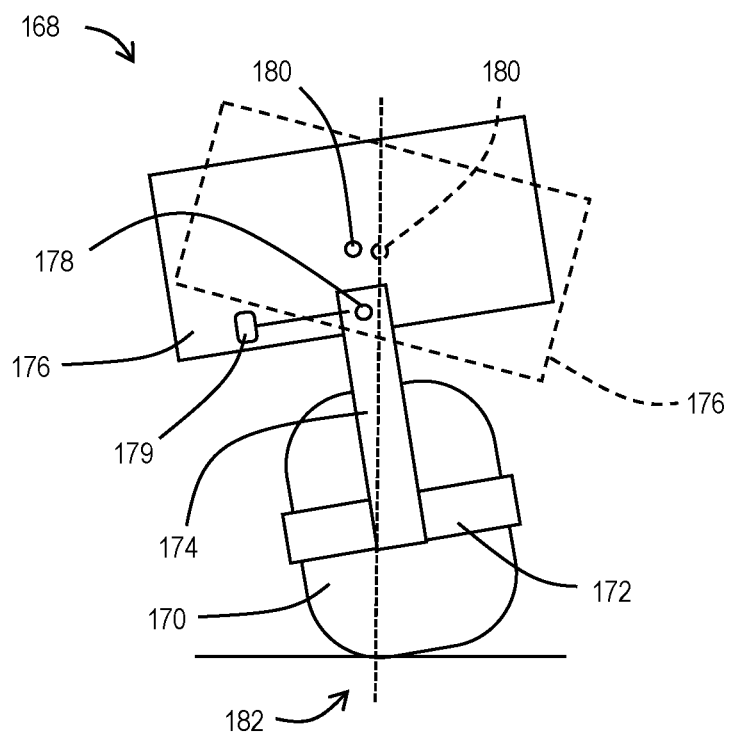
FIG. 4 is a schematic front view of yet another illustrative self-balancing vehicle in accordance with aspects of the present teachings, depicting the vehicle before and after stabilizing itself laterally.

Example situations illustrating this lateral self-stabilization ability are depicted in FIGS. 3-4. FIG. 3 is a schematic front view of a vehicle 150, which is an example of vehicle 100. Vehicle 150 has a linkage comprising a linkage frame 152 and a linkage strut 154. Linkage frame 152 extends around a wheel 156 and is coupled to an axle of the wheel. Linkage strut 154 is pivotably coupled to linkage frame 152 at a pivoting joint 158, and is rigidly coupled to a vehicle frame 160. In FIG. 3, solid lines depict vehicle 150 tipping laterally, with a center of gravity 162 of the vehicle disposed outboard of a contact patch 164 between the vehicle and the ground. Dashed lines depict vehicle frame 160 and linkage strut 154 pivoted by an actuator 166 of the self-stabilizing system such that center of gravity 162 is positioned over contact patch 164, laterally stabilizing the vehicle.

FIG. 4 depicts another illustrative self-balancing vehicle 168 having a wheel 170, a linkage frame 172 coupled to an axle of the wheel, and a linkage strut 174. In contrast to the linkage of vehicle 150, linkage strut 174 is rigidly coupled to linkage frame 172 and pivotably coupled to a vehicle frame 176 at a pivoting joint 178. Solid lines depict vehicle 168 tipping laterally, and dashed lines depict vehicle frame 176 pivoted about joint 178 by an actuator 179, such that a center of gravity 180 of the vehicle is again positioned over a contact patch 182 between the vehicle and the ground. This is another example of laterally self-balancing vehicle 100. Other configurations are possible, with further examples described below.

Aspects of the lateral self-stabilization system of vehicle 100 are, in some examples, used for steering. Specifically, controller 134 may be further configured to cause actuator 130 to tilt frame 124 about lateral tilt axis 128 so as to shift the weight of vehicle 100, thereby steering the vehicle into a turn (e.g., without steering or turning the wheel).

Figure 5:
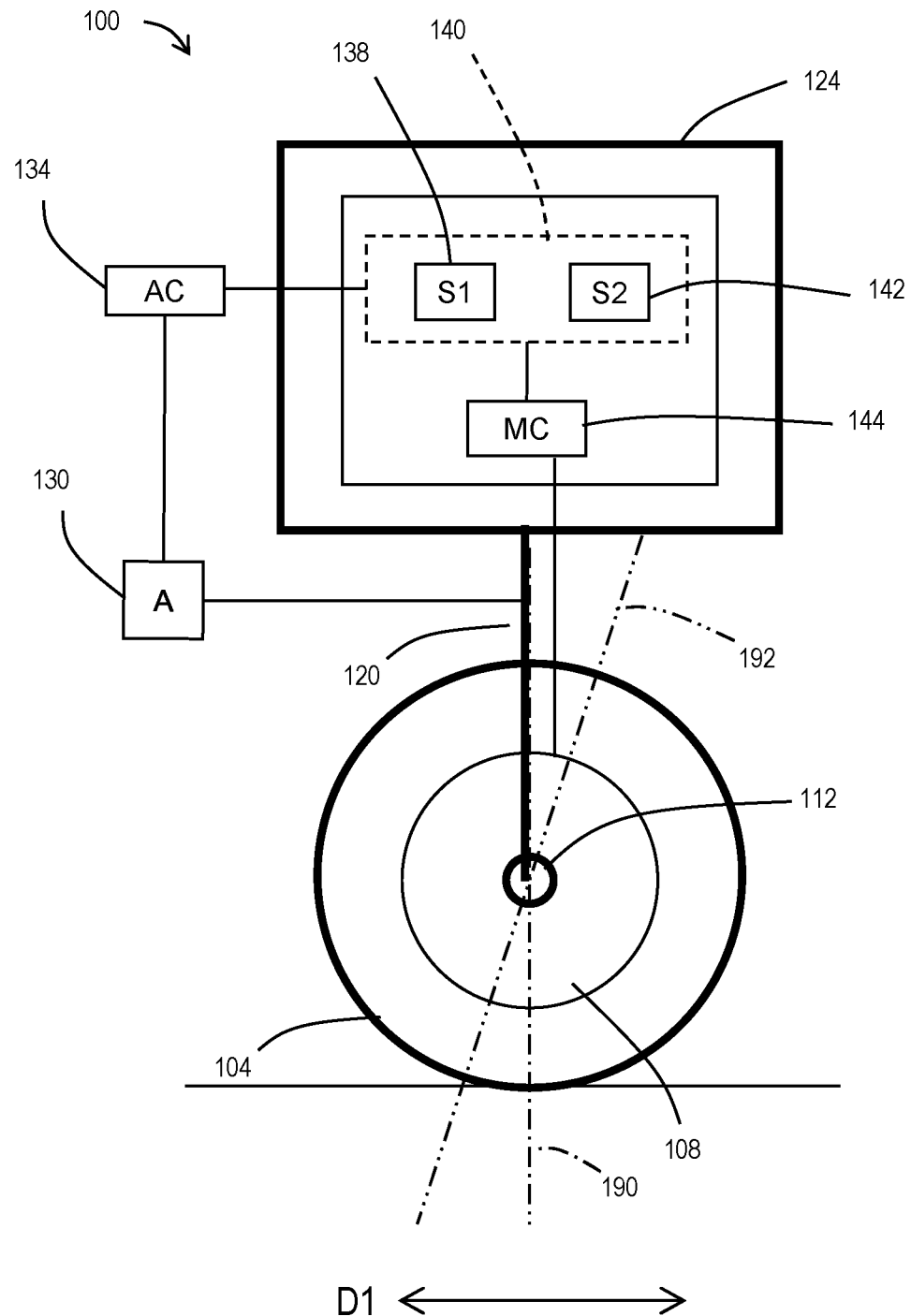
FIG. 5 is a schematic side view of the vehicle of FIG. 1, depicting illustrative aspects of the vehicle's fore-aft self-stabilization ability.

In some examples, vehicle 100 is further configured to be self-balancing in a fore-aft direction, as well as in a lateral direction in the manner described above. FIG. 5 is a side view of vehicle 100 illustrating the fore-aft balancing function. Fore-aft balancing of vehicle 100 may be achieved through the use of a feedback control loop or mechanism of controller 134 and/or another suitable controller. Pitch sensor 142 is configured to measure a pivoting (e.g., a pitch angle) of vehicle 100 about rotation axis 116. Sensor 142 may comprise one or more gyros, accelerometers, IMUs, etc., and in some example is the same sensor as sensor 138.

The sensed pitch angle is received from sensor 142 by motor controller 144. Motor controller 144 is configured to drive motor assembly 108 based on the sensed pitch information to propel vehicle 100 in a manner that keeps the vehicle and/or selected portion thereof at a reference pitch angle (AKA a balance angle). The value of the reference pitch angle used by motor controller 144 may be selected appropriately for a given example of vehicle 100 to enable the motor controller to selectively propel the vehicle forward and/or backward.

For example, some self-balancing vehicles are configured to be operated by a driver positioned on or in frame 124 (which may comprise a seat, foot deck, and/or other suitable rider support). In such an example, the reference pitch angle may be set to zero degrees. A zero-degree reference angle 190 is indicated in FIG. 5. Zero-degree reference angle 190 corresponds to a position wherein a fore portion of vehicle 100 is approximately level with an aft portion of the vehicle, as in FIG. 5. Accordingly, if the rider of the vehicle leans the vehicle forward or backward, motor controller 144 causes motor assembly 108 to propel the vehicle forward in a manner that tilts the vehicle back to the zero-degree reference pitch. For example, leaning the vehicle forward may cause the motor speed to be increased, while leaning the vehicle backward may cause the motor speed to be decreased. In some examples of a rider-operated vehicle, the reference pitch angle is adjustable (e.g., directly and/or using an adjustable offset parameter), such that motor controller 144 may attempt to maintain an angle different than zero degrees. Alternatively, or additionally, the reference pitch may be constant or nonadjustable, and motor controller 144 may be configured to maintain a nonzero offset from the reference pitch (AKA a balance offset or balance offset parameter).

As another example, vehicle 100 may be a robotic vehicle configured to be operated without a rider, and/or without rider input. A robotic vehicle may be caused to move forward by selecting a nonzero reference angle. An example nonzero reference angle 192 is depicted in FIG. 5. With a nonzero reference angle such as angle 192, when the vehicle is positioned upright (i.e., at a zero-degree pitch, as in FIG. 5), motor controller 144 drives motor assembly 108 to propel the vehicle forward. This allows the vehicle to be moved forward in the absence of a rider. As another example, the reference angle may be fixed at zero degrees (e.g., at zero-degree reference angle 190), and motor controller 144 may be configured to drive motor assembly 108 to maintain the vehicle at a selected offset angle from the reference angle. The offset angle may be continuously or discretely adjustable, e.g., remotely. In some examples, the controller may be configured to switch between two or more programmed offset angles. In other words, the reference angle may remain at zero degrees, and the motor controller may be configured to drive motor assembly 108 to propel vehicle 100 at a nonzero offset from the reference angle. A speed and/or direction of the robotic vehicle may be adjusted by changing the reference angle and/or angle offset. Suitable reference angles or reference angle offsets may be determined by the controller itself, e.g., using a feedback loop, and/or may be communicated to the controller by another system (e.g., a user-operated remote control, a remote computer system, etc.).

As yet another example, motor controller 144 may be configured to calculate a motor torque (or a variable sufficient to command the torque, such as a current or voltage) that would propel the vehicle to achieve a selected reference angle (e.g., zero degrees), and then to actually drive the motor at a torque higher than that calculated torque. This is another control scheme enabling the vehicle to be propelled forward while upright.

In some situations, side-to-side (roll) stability is achieved through a combination of bi-direction fore-aft and side-to-side motions, the result of which is to keep the vehicle frame's center of mass located approximately vertically above the point at which the wheel contacts the ground, at least on average as a function of time. This combined motion is similar to the manner in which a bicyclist or a unicyclist achieves stability when performing a track stand, i.e., through small shifts in weight and back-and-forth rolling motions, but without any overall fore-aft displacement.

Vehicle 100 described above is an illustrative example of a vehicle having a frame coupled to a wheel axle by a linkage enabling the frame to laterally tilt relative to the axle. Numerous variations are possible. The following paragraphs describe, without limitation, illustrative examples of vehicle frames and linkages. As described above with reference to vehicle 100, the following example vehicle frames are configured to be laterally tilted by an actuator, which is controlled by a controller in response to orientation information sensed by one or more suitable sensors.

Figure 6:
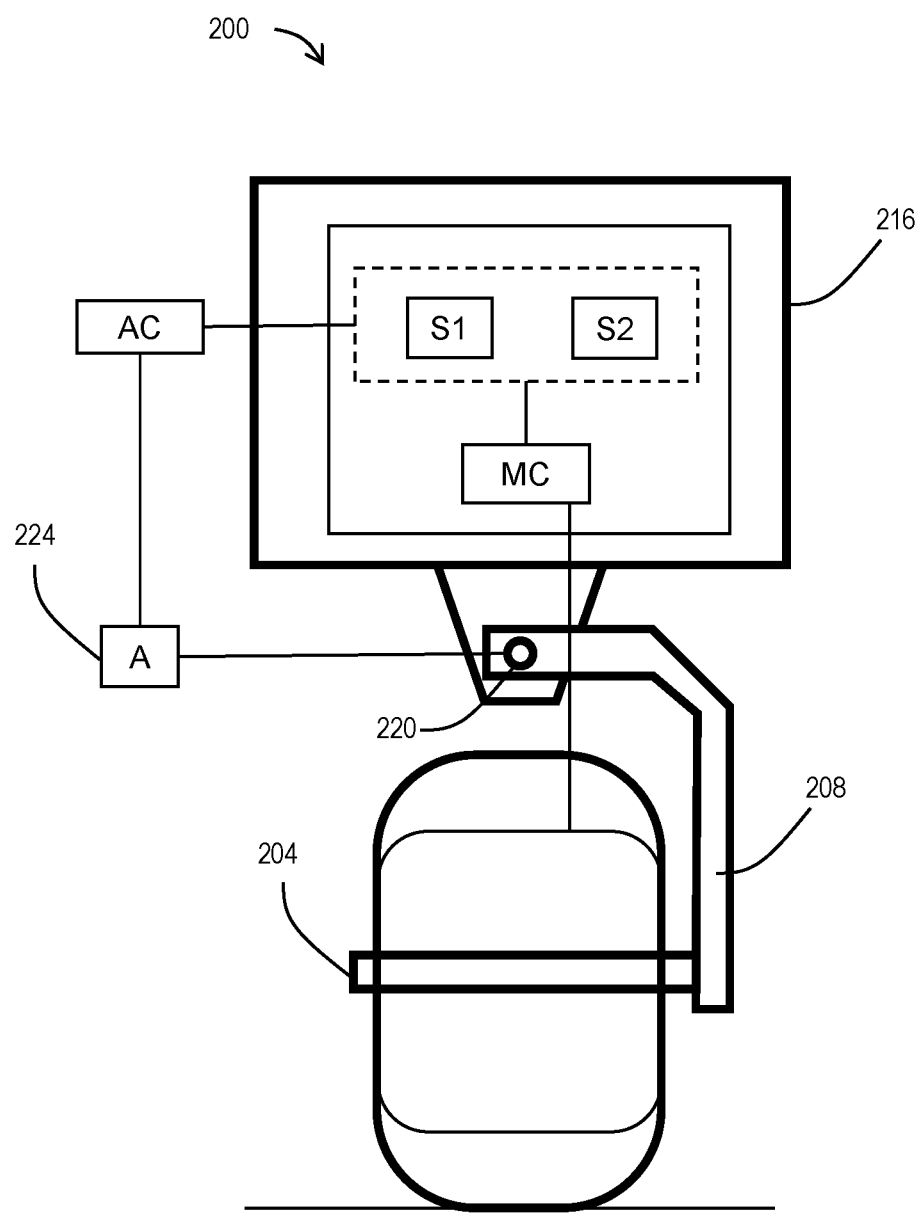
FIG. 6 is a schematic front view of yet another illustrative self-balancing vehicle in accordance with aspects of the present teachings.

FIG. 6 depicts an example vehicle 200 having a wheel axle 204 coupled at only a first end to a linkage comprising an angled strut 208. Angled strut 208 is pivotably coupled to a frame 216 at a pivoting joint 220. An actuator 224 is configured to rotate frame 216 about pivoting joint 220. Actuator 224 comprises a rotary actuator, such as a torque motor.

Figure 7:
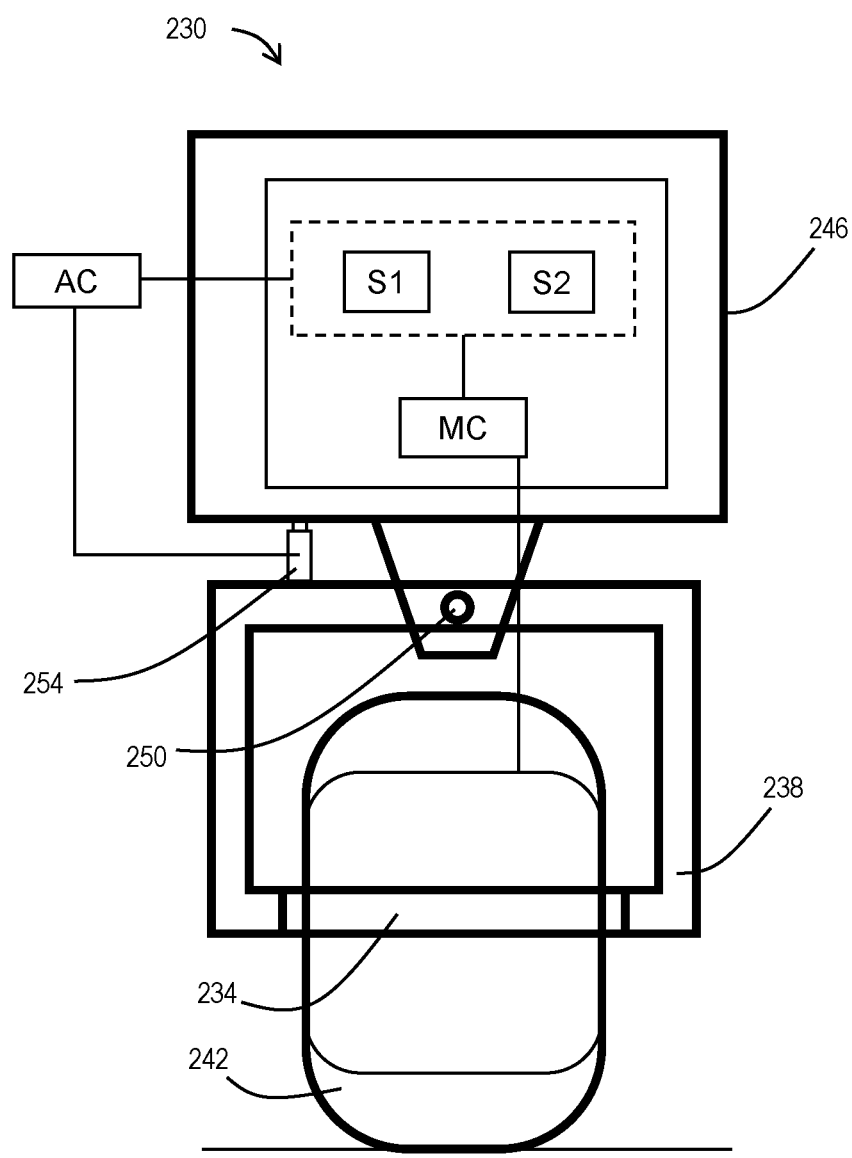
FIG. 7 is a schematic front view of yet another illustrative self-balancing vehicle in accordance with aspects of the present teachings.

FIG. 7 depicts an example vehicle 230 having a wheel axle 234 coupled to a linkage 238, which comprises a rectilinear stirrup extending over a wheel 242 and attached to both ends of the wheel axle. An upper portion of linkage 238 (e.g., a portion of the linkage disposed above a center of wheel 242 when the vehicle is upright) is coupled to a frame 246 at a pivoting joint 250. A linear actuator 254 is configured to rotate frame 246 about pivoting joint 250 by pushing and/or pulling a portion of the frame relative to linkage 238. In other examples, linear actuator 254 may be omitted, and a rotary actuator may be disposed at pivoting joint 250 to rotate frame 246.

Figure 8:
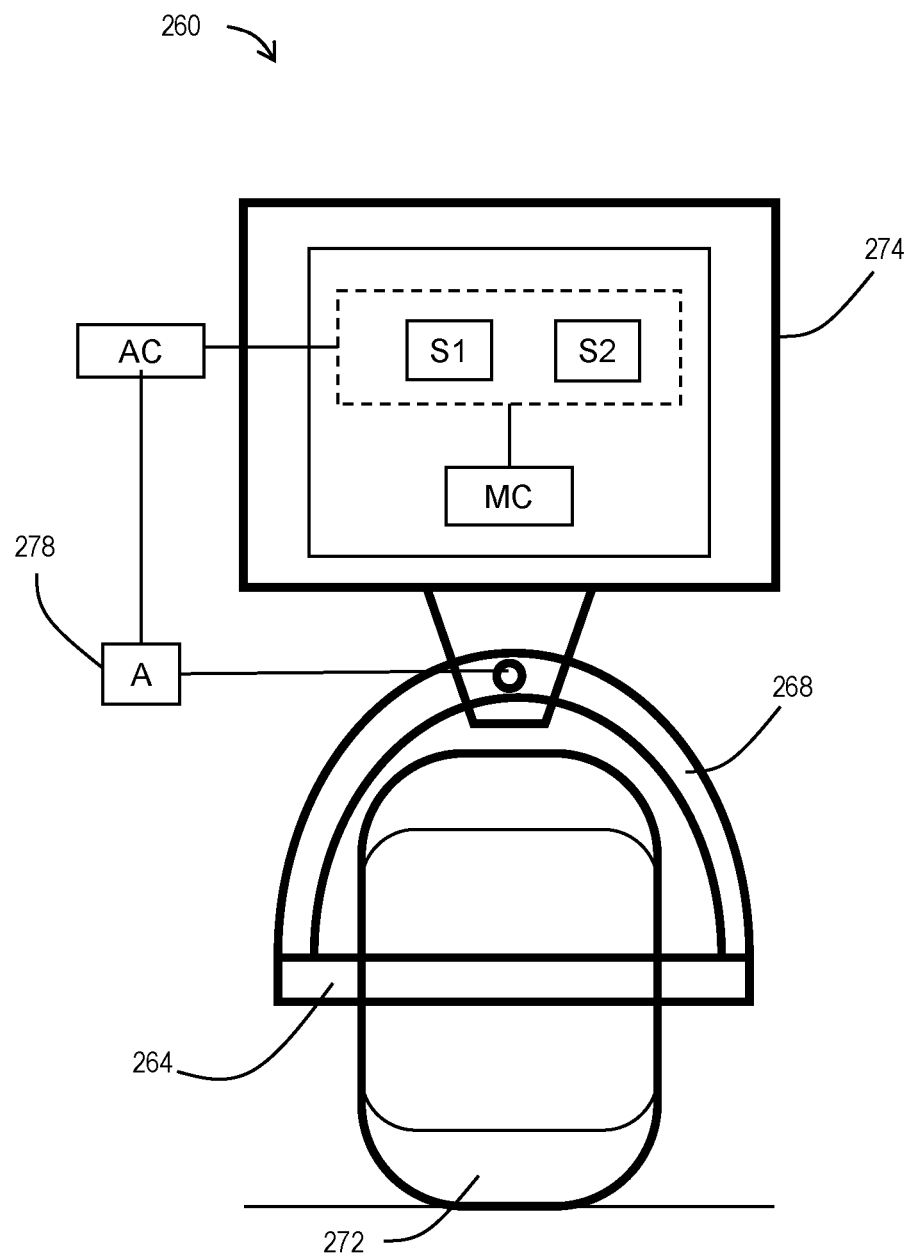
FIG. 8 is a schematic front view of yet another illustrative self-balancing vehicle in accordance with aspects of the present teachings.

FIG. 8 depicts an example vehicle 260 having a wheel axle 264 coupled to a curved (e.g., stirrup) linkage 268, which extends in an arc over a wheel 272 to couple to both ends of the wheel axle. A frame 274 is coupled to the arcuate portion of linkage 268 such that the frame is translatable along the arcuate portion (e.g., by an actuator 278). Translating frame 274 along the arcuate portion of curved linkage 268 tilts the frame in the lateral (side-to-side) direction. Actuator 278 in this example may include a gear drive, such as a curved rack and pinion.

Figure 9:
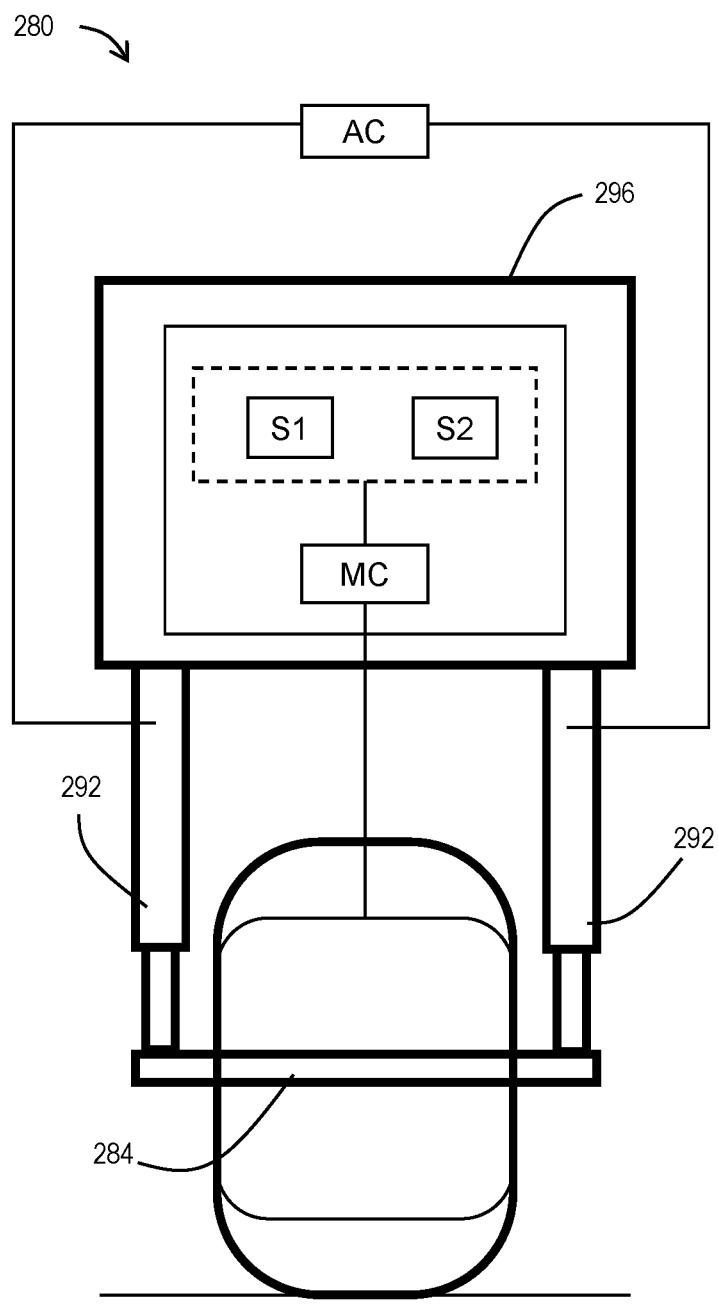
FIG. 9 is a schematic front view of yet another illustrative self-balancing vehicle in accordance with aspects of the present teachings.

FIG. 9 depicts an example vehicle 280 having a wheel axle 284 coupled at each end to a respective linear actuator 292. Each actuator 292 is pivotably coupled to a respective side of a frame 296. Frame 296 is tiltable in a side-to-side direction by differentially raising and/or lowering sides of the frame using actuators 292.

Figure 10:
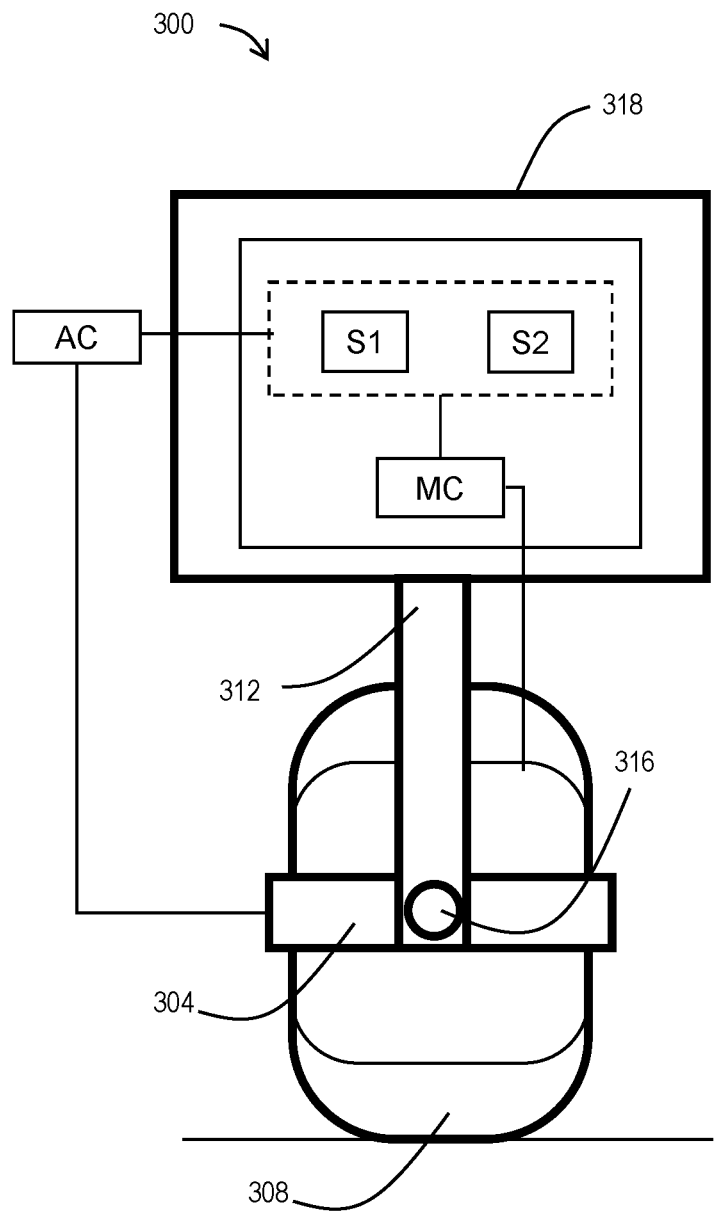
FIG. 10 is a schematic front view of yet another illustrative self-balancing vehicle in accordance with aspects of the present teachings.

FIG. 10 depicts an example vehicle 300 having a first linkage portion 304 or frame extending around a wheel 308 and coupled to both ends of a wheel axle (not shown). An end of first linkage portion 304 is coupled to a linkage strut 312 by a direct-drive actuator 316 configured to rotate the strut relative to the first linkage portion. A frame 318 (e.g., of a cargo or rider compartment) is rigidly coupled to strut 312, such that rotating the strut using actuator 316 tilts the frame laterally. First linkage portion 304 is in some examples also coupled to another strut by a pivoting joint at an opposite end of the first linkage portion (not shown).

Figure 11:
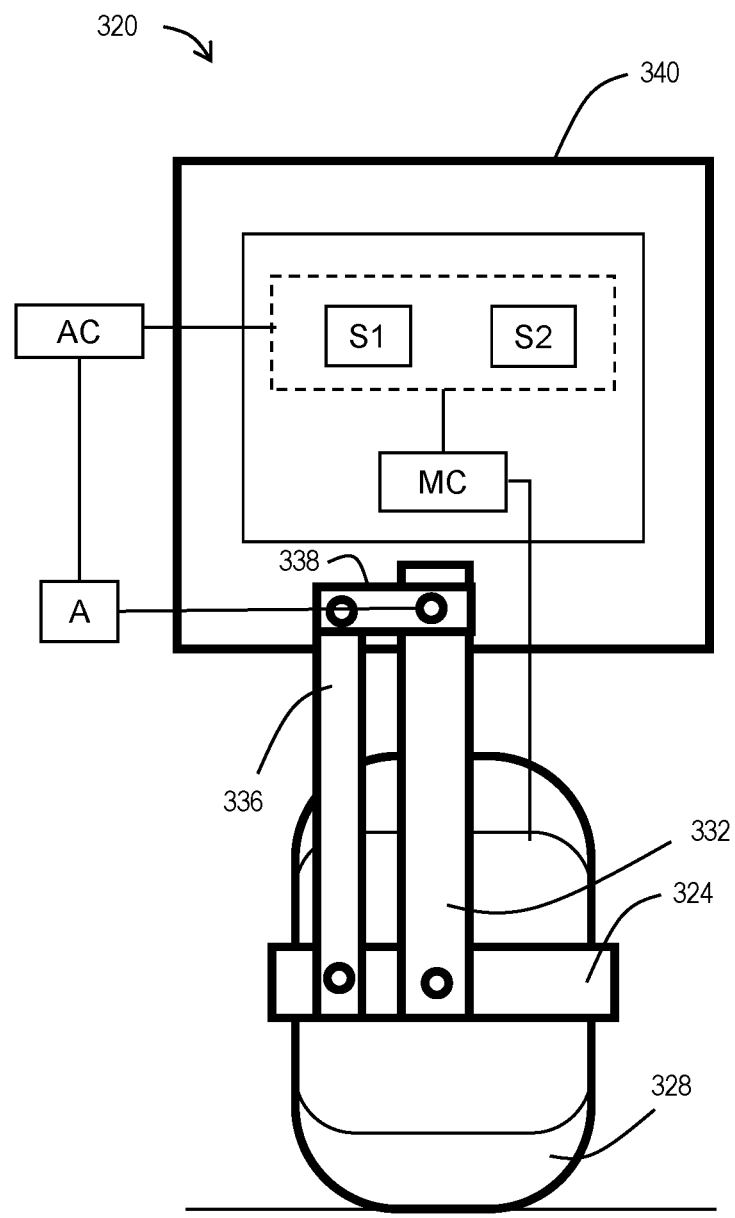
FIG. 11 is a schematic front view of yet another illustrative self-balancing vehicle in accordance with aspects of the present teachings.

FIG. 11 depicts an example vehicle 320 having a first linkage portion 324 extending around a wheel 328 and coupled to both ends of a wheel axle (not shown). An end portion of first linkage portion 324 is coupled to a linkage strut 332 and to a linkage bar 336. Strut 332 is fixed to a frame 340 and coupled to an arm 338, forming a four-bar linkage with the frame and first linkage portion 324. Any suitable actuator(s) may be configured to tilt frame 340 using the four-bar linkage. For example, a rotary actuator A may be utilized to rotate arm 338 and thereby apply a tilting force via bar 336.

Figure 12:
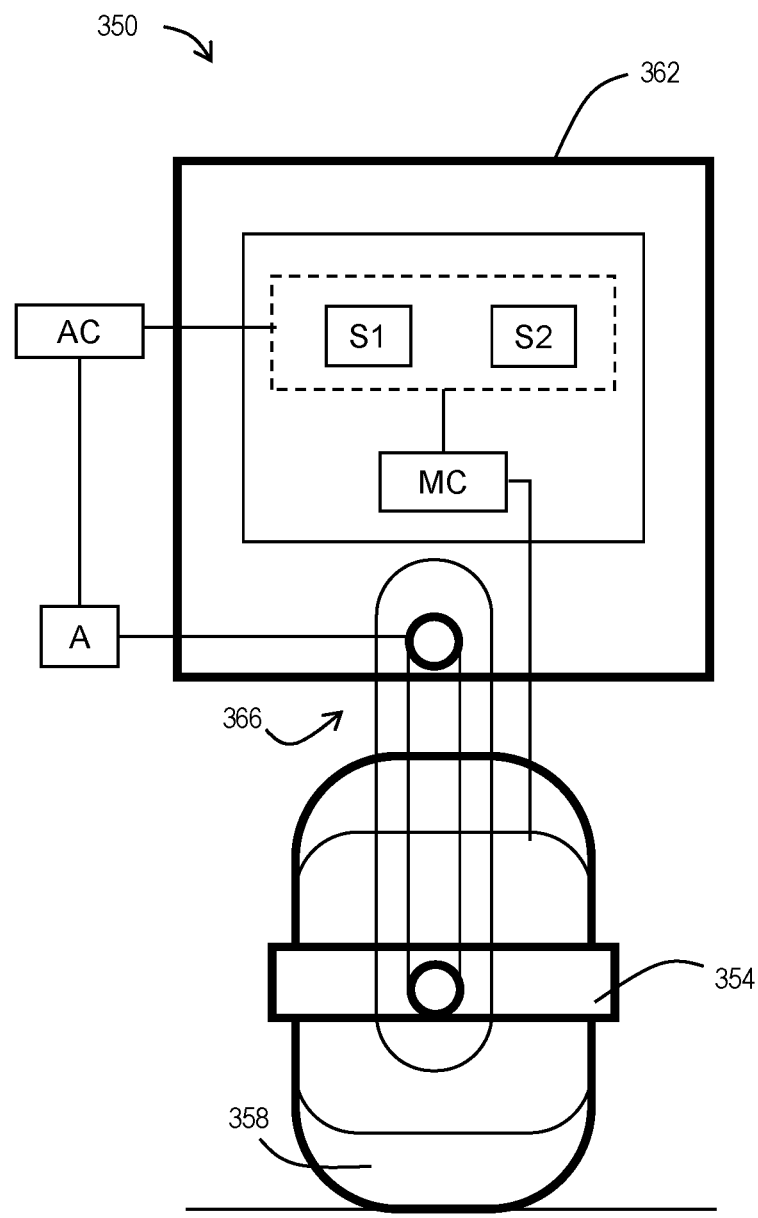
FIG. 12 is a schematic front view of yet another illustrative self-balancing vehicle in accordance with aspects of the present teachings.

FIG. 12 depicts an example vehicle 350 having a first linkage portion 354 extending around a wheel 358, coupled to a wheel axle (not shown), and coupled at an end portion to a frame 362 by a belt (or chain) drive 366, which is actuatable to tilt the frame relative to the wheel axle.

B. Illustrative Robotic Vehicle

Figure 13:
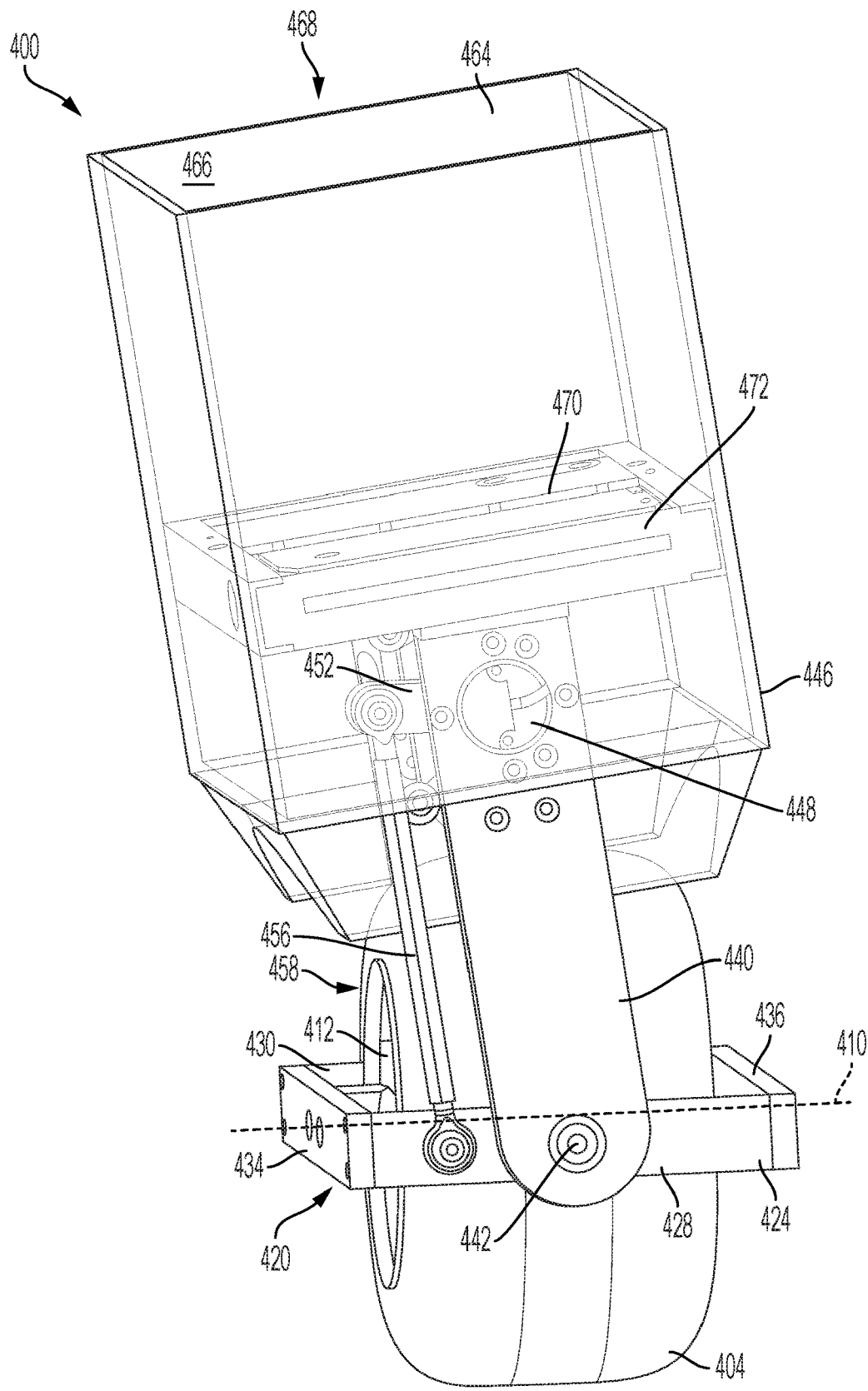
FIG. 13 is an isometric front view of an illustrative robotic self-balancing vehicle in accordance with aspects of the present teachings.
Figure 14:
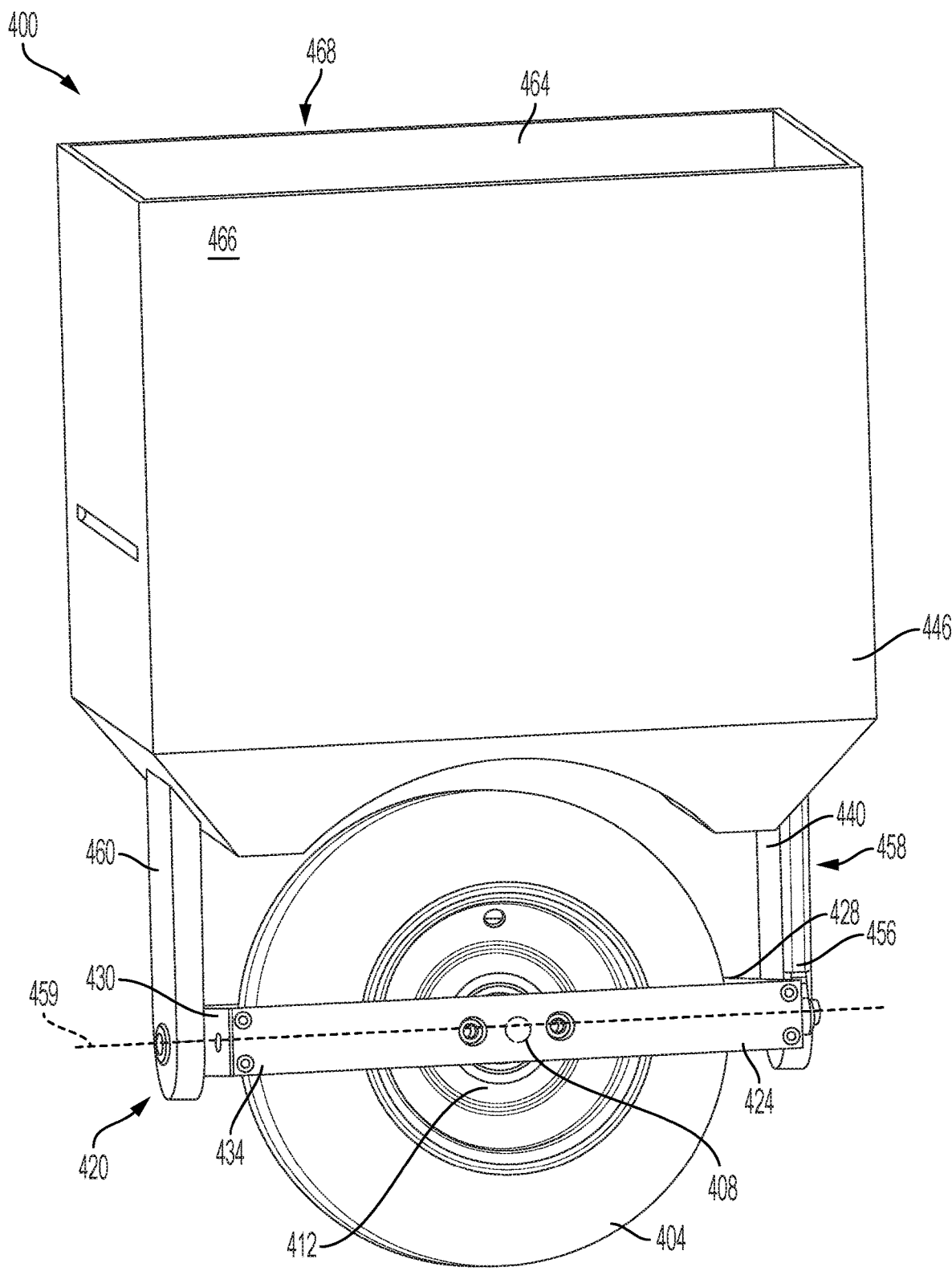
FIG. 14 is an isometric side view of the vehicle of FIG. 13.

With reference to FIGS. 13-14, this section describes an illustrative robotic vehicle 400 in accordance with aspects of the present teachings. Robotic vehicle 400 is another example of a self-balancing electric vehicle configured for self-stabilization in a lateral direction and in a fore-aft direction, as described above. Vehicle 400 is an embodiment of vehicle 320 of FIG. 11.

FIG. 13 is an isometric end view of vehicle 400, depicting a portion of the vehicle frame as transparent for clarity. FIG. 14 is a side isometric view of vehicle 400. As shown in FIGS. 13-14, vehicle 400 has a single wheel 404 configured to rotate about an axle 408, which defines a rotation axis 410 (AKA a pitch axis). A motor assembly 412 including a hub motor (or other suitable motor) is disposed within wheel 404 and configured to rotate wheel 404 about axle 408 to propel vehicle 400 in a fore-aft direction.

Axle 408 is coupled at both ends to a linkage 420. Linkage 420 comprises a linkage frame 424 extending around wheel 404. Linkage frame 424 is shaped as a rectilinear ring disposed at the height of axle 408 on vehicle 400. Accordingly, linkage frame 424 has opposing first and second end portions 428 and 430 disposed parallel to and coplanar with axle 408, and opposing first and second side portions 434, 436 disposed orthogonal to and coplanar with the axle and the end portions.

At first end portion 428, linkage frame 424 is pivotably coupled to a strut 440 by a pivoting joint 442. Strut 440 is coupled to a vehicle frame 446 (AKA a vehicle body) at a fixed joint. A rotary actuator 448, which in this example is a torque motor, couples strut 440 to an arm 452. A rod 456 is pivotably coupled to a distal end of arm 452 and to first end portion 428 of linkage frame 424. Accordingly, first end portion 428, strut 440, arm 452, and rod 456 comprise a four-bar linkage 458. Four-bar linkage 458 allows vehicle frame 446 to tilt laterally (i.e., about a lateral tilt axis 459) relative to linkage frame 424 in response to rotation applied by rotary actuator 448.

Four-bar linkage 458 allows the center-of-gravity impact of rotary actuator 448 to be well above the lateral tilt axis, increasing stability of vehicle 400 along both the lateral tilt and the wheel-rotation axes. This configuration can also allow vehicle 400 to have a small footprint (e.g., a footprint not substantially wider than the ground-contacting element of the vehicle).

As shown in FIG. 14, a support strut 460 is disposed at second end portion 430 of linkage frame 424. Support strut 460 pivotably couples vehicle frame 446 to linkage frame 424, thereby helping to support the vehicle frame above the linkage frame and allowing the vehicle frame to tilt laterally. Support strut 460 may be omitted in some examples (e.g., examples wherein the vehicle frame can be supported by strut 440 and rod 456 alone).

Vehicle frame 446 comprises a cargo compartment 464 configured to receive and hold suitable object(s). Accordingly, vehicle 400 may be used to hold and transport goods (e.g., in a warehouse, for delivery, and/or for any other suitable indoor and/or outdoor applications). In this example, cargo compartment 464 has four walls 466 and an open top 468. However, in general a cargo compartment may have any suitable configuration, including a securable lid and/or side access door.

An electronics module 470 is disposed within cargo compartment 464. Electronics module 470 includes one or more sensors and control system(s) of vehicle 400. For example, electronics module 470 includes at least one roll sensor configured to sense a lateral orientation of the vehicle, a controller configured to actuate rotary actuator 448 based on the sensed lateral orientation, a pitch sensor configured to sense an orientation of the vehicle about axle 408, and a motor controller configured to propel motor assembly 412 based on the sensed pitch.

Electronics module 470 may be enclosed by a suitable protective housing or container 472 within cargo compartment 464 to avoid damage from the contents of the cargo compartment and/or environmental hazards. In FIG. 13, a top portion of the protective container is omitted to better illustrate the electronics module. In this example, container 472 of electronics module 470 comprises a bottom of the cargo-carrying volume of cargo compartment 464. However, other suitable configurations are possible. Cargo compartment walls 466 extend below container 472 (e.g., beyond the bottom of the cargo space) such that the walls protect rotary actuator 448 and at least some other portions of four-bar linkage 458.

C. Illustrative Skateboard

Figure 15:
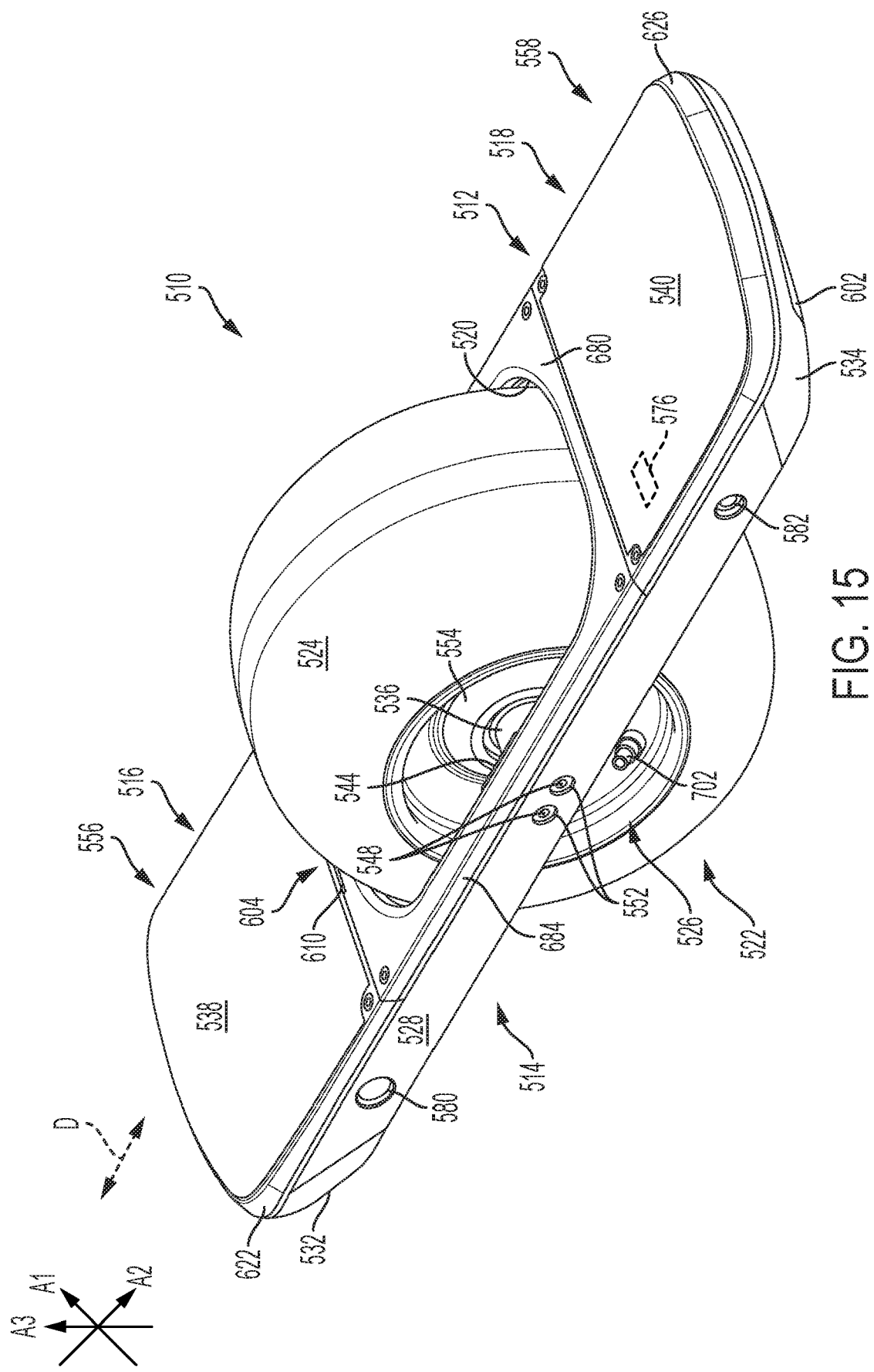
FIG. 15 is an isometric view of an illustrative self-balancing electric skateboard in accordance with aspects of the present teachings.
Figure 16:
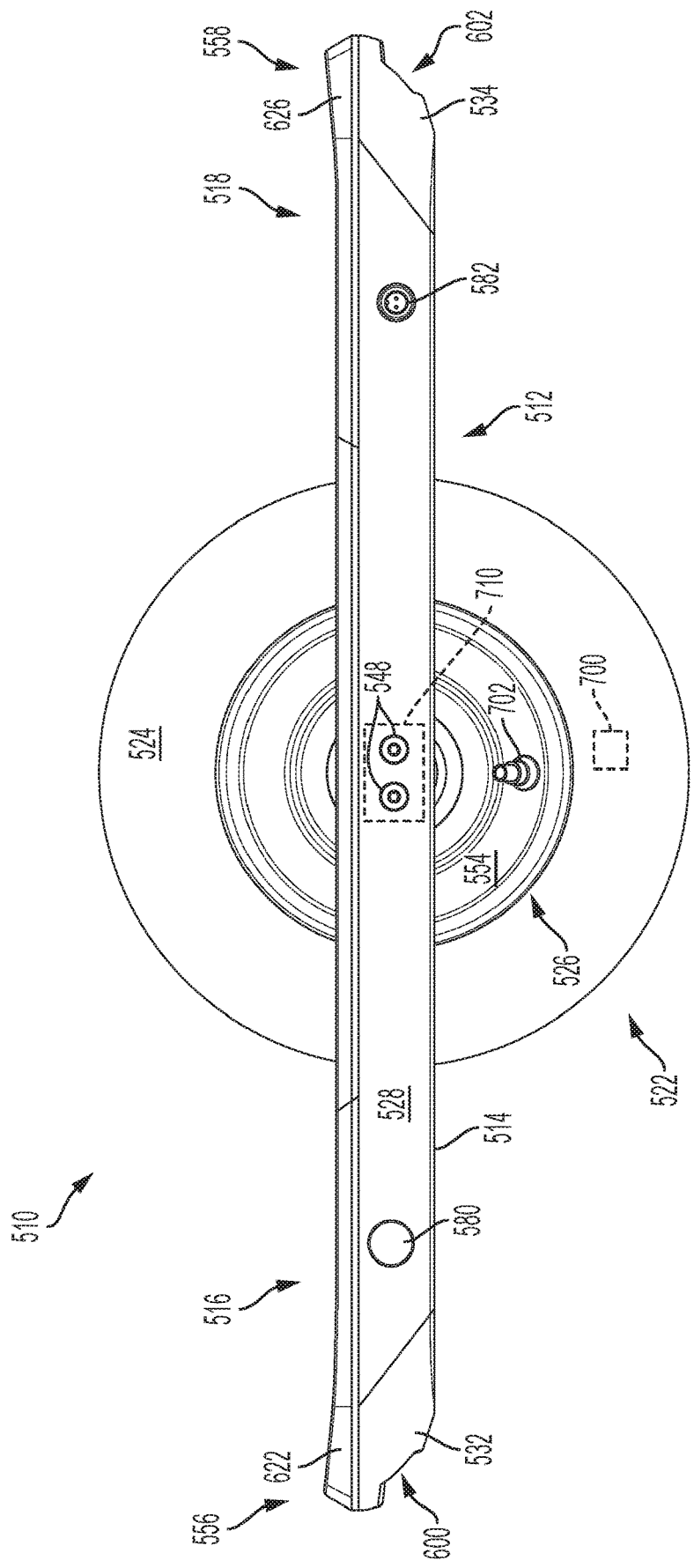
FIG. 16 is a side view of the skateboard of FIG. 15.

With reference to FIGS. 15-16, this section describes an illustrative one-wheeled skateboard 510, which is another example of a self-balancing electric vehicle. Any of the roll compensation systems described above with respect to FIGS. 1-12 may be combined with the one-wheeled skateboard described below.

FIG. 15 is an isometric view of skateboard 510, and FIG. 16 is a side view of the skateboard. As FIGS. 15-16 show, skateboard 510 has a board 512 (AKA a platform or foot deck) having a board frame 514 supporting a first deck portion 516 and a second deck portion 518 defining an opening 520 therebetween. Board 512, board frame 514, and deck portions 516 and 518 together comprise a vehicle frame that is an example of vehicle frame 124, described above with reference to illustrative vehicle 100 (i.e., a vehicle frame coupled by a linkage to an axle of a wheel and configured to tilt).

Board 512 may generally define a plane. Each deck portion 516, 518 (AKA footpad) is configured to receive and support a left or right foot of a rider oriented generally perpendicular to a direction of travel of the board (e.g., a fore-aft direction), indicated generally at D. First and second deck portions 516, 518 may be formed of the same physical piece, or may be separate pieces, and may be included in (e.g., integral with) board 512.

Skateboard 510 also includes a wheel assembly 522. Wheel assembly 522 includes a rotatable ground-contacting element 524 (e.g., a tire, wheel, or continuous track) disposed between and extending above first and second deck portions 516, 518, and a motor assembly 526 configured to rotate ground-contacting element 524 to propel the vehicle. In this example, skateboard 510 includes exactly one ground-contacting element, disposed between the first and second deck portions. In some examples, vehicle 510 may include a plurality of (e.g., coaxial) ground-contacting elements.

Skateboard 510 has a pitch axis A1, a roll axis A2, and a yaw axis A3. Pitch axis A1 is the axis about which wheel 524 is rotated by motor assembly 526. For example, pitch axis A1 may pass through an axle 536 of the motor assembly (e.g., pitch axis A1 may be parallel to and aligned with an elongate direction of axle 536). Roll axis A2 is perpendicular to pitch axis A1, and may substantially extend in direction D (i.e., the direction in which vehicle 510 may be propelled by the motor assembly). For example, roll axis A2 may extend in an elongate direction of board 512. Yaw axis A3 is perpendicular to pitch axis A1 and to roll axis A2. For example, yaw axis A3 may be normal to a plane defined by deck portions 516, 518. Axes A1 and A2 may be analogous to the Y and X axes (e.g., corresponding to horizontal), while axis A3 is analogous to the Z axis (e.g., corresponding to vertical). Pitch axis A1 and roll axis A2 may lie in a plane of the board. In some embodiments, the pitch and roll axes may define this plane.

Wheel assembly 522 is disposed between first and second deck portions 516, 518. Ground-contacting element 524 is coupled to motor assembly 526. Motor assembly 526 is mounted to board 512. Motor assembly 526 includes axle 536 (AKA a shaft), which is coupled to board 512 by a linkage that allows the board to tilt laterally relative to the axle (e.g., about a roll or lateral tilt axis oriented orthogonal to the axle), and by an actuator configured to laterally tilt the board. A roll compensation assembly 710 comprising a linkage and actuator is schematically depicted in FIG. 16. Suitable actuators may include a worm-gear motor, a direct-drive motor, and/or the like. The linkage of tilt assembly 710 may include any suitable components configured to facilitate lateral tilting and/or compensation therefor. Several suitable examples of tilt assembly 710 are described above with respect to FIGS. 1-12. In the depicted example, the linkage includes axle mounting blocks 544 disposed at either end of axle 536 and affixed to board frame 514 by fasteners 548 received in through-holes 552 of the board frame.

Motor assembly 526 is configured to rotate ground-contacting element 524 around (e.g., about) axle 536 to propel skateboard 510. For example, motor assembly 526 may include an electric motor, such as a hub motor, configured to rotate ground-contacting element 524 about axle 536 to propel vehicle 510 along the ground. For convenience, ground-contacting element 524 is hereinafter referred to as a tire or wheel, although other suitable embodiments may be provided.

Motor assembly 526 may include any suitable driver of tire/wheel 524, such as a hub motor 554 mounted within tire (or wheel) 524. The hub motor may be internally geared or may be direct-drive. The use of a hub motor facilitates the elimination of chains and belts, and enables a form factor that considerably improves maneuverability, weight distribution, and aesthetics. Mounting tire 524 onto hub motor 554 may be accomplished by either a split-rim design that may use hub adapters, which may be bolted on to hub motor 554, or by casting a housing of the hub motor such that it provides mounting flanges for a tire bead directly on the housing of the hub motor.

Skateboard 510 may include any suitable control system. In general, at least a portion of the electrical components comprising the control system are integrated into board 512. For example, board 512 may include a first environmental enclosure housing a power supply, and a second environmental enclosure housing a motor controller 576. The power supply may include one or more batteries (e.g., secondary or rechargeable batteries), such as one or more lithium batteries that are relatively light in weight and have a relatively high power density. In some examples, the power supply may include one or more lithium iron phosphate batteries, one or more lithium polymer batteries, one or more lithium cobalt batteries, one or more lithium manganese batteries, or a combination thereof. For example, the power supply may include sixteen (16) A123 lithium iron phosphate batteries (e.g., size 8050). The batteries of the power supply may be arranged in a 1651 P configuration, or any other suitable configuration. The motor controller may include any suitable processing logic. The environmental enclosures are configured to protect the one or more electrical components from being damaged, e.g., by water ingress. An example electrical system including a power supply and control system is described in the next section with reference to FIG. 17.

The vehicle control system generally includes suitable electronics for controlling the vehicle motor. For example, a microcontroller and/or one or more sensors may be included in or connected to motor controller 576. At least one of the sensors is configured to measure orientation information (or an orientation) of board 512. For example, one or more sensors are configured to sense movement of board 512 about and/or along the pitch, roll, and/or yaw axes. The motor is configured to cause rotation of wheel 524 based on the orientation of board 512. In particular, motor controller 576 may be configured to receive orientation information measured by the at least one sensor and to cause motor assembly 526 to propel the electric vehicle based on the orientation information. For example, the motor controller may be configured to drive hub motor 554 based on received sensed movement of board 512 from the sensors via to propel and/or actively balance vehicle 510 along pitch and/or roll axes.

First and second deck portions 516, 518 are located on opposite sides of wheel assembly 522 with board 512 being dimensioned to approximate a skateboard. In other embodiments, the board may approximate a longboard skateboard, snowboard, surfboard, or may be otherwise desirably dimensioned. Deck portions 516 and 518 may include any suitable structures configured to support the feet of a rider, such as non-skid surfaces 538, 540, as well as vehicle-control features, such as various sensors and a rider detection system. In some examples, a rider detection system includes a strain gauge rider detection system.

Board frame 514 may include any suitable structure configured to rigidly support the deck portions and to be coupled to the axle of the wheel assembly such that the weight of a rider may be supported on tiltable board 512, with board frame 514 tiltable about pitch and roll axes.

Board frame 514 includes one or more frame members 528, on which deck portions 516 and 518 are mounted, and which may further support additional elements and features of the vehicle, such as a charging port 582, a power switch 580, and end bumpers 532, 534, as well as lighting assemblies, battery and electrical systems, electronics, controllers, and the like.

First bumper 532 is integrated into (or coupled to) a first end 556 of board 512 proximal first deck portion 516, and second bumper 534 is integrated into (or coupled to) a second end 558 of board 512 proximal second deck portion 518. Bumpers 532, 534 may be referred to as skid pads, and may be replaceable and/or selectively removable. For example, the bumpers may include replaceable polymer parts or components, and/or may each be entirely replaceable as a single piece. In some embodiments, the bumpers may be configured to allow the rider to bring vehicle 510 to a stop in an angled orientation (e.g., by setting one end of the board against the ground after the rider removes their foot from a rider detection device or switch, which is described below in further detail). In this context, the bumpers may be configured to be abrasion-resistant and/or ruggedized. A removable connection of the bumpers to the board may enable the rider (or other user) to selectively remove one or more of these components that become worn with abrasion, and/or replace the worn bumper(s) with one or more replacements.

Bumpers 530, 532 may include respective apertures 600, 602, through which illuminators (e.g., headlight and/or taillight assemblies configured to indicate a direction of movement of the vehicle by changing color) may shine. Apertures 600, 602 may be dimensioned to prevent the illuminators from contacting the ground. For example, apertures 600, 602 may each have a depth or inset profile.

Tire 524 may be wide enough in a heel-toe direction (e.g., in a direction parallel to pitch axis A1) that the rider can balance in the heel-toe direction manually, i.e., by shifting his or her own weight, without automated assistance from the vehicle. Tire 524 may be tubeless, or may be used with an inner tube. In some examples, tire 524 may be a non-pneumatic tire. For example, tire 524 may be "airless", solid, and/or may comprise a foam. Tire 524 may have a profile such that the rider can lean vehicle 510 over an edge of the tire (and/or pivot the board about roll axis A2 and/or yaw axis A3) through heel and/or toe pressure to facilitate cornering of vehicle 510. In some situations, leaning the skateboard over the edge of the tire about roll axis A2 activates the lateral self-stabilization system of the skateboard (i.e., tilt assembly 710 and associated sensors and controllers).

Skateboard 510 may include any suitable apparatus, device, mechanism, and/or structure for preventing water, dirt, or other road debris from being transferred by the ground-contacting element to the rider. In some examples, the vehicle may include a full fender configured to fully cover an upper periphery of tire 524. A full fender may be coupled to frame 514, e.g., using fasteners and/or magnetic connectors, and configured to prevent debris from being transferred from tire 524 to the rider, such as when tire 524 is rotated about pitch axis A1. Alternatively, a fender substitute 680 (AKA a "fender delete") may be installed in place of the full fender, coupled to board frame 514 at a peripheral flange 684 of the fender substitute, as shown in FIGS. 15-16. The fender delete (and fender, if included) are configured to cover and protect the frame members, manage the gap around the tire (e.g., for safety and aesthetics), to snap to the axle mounting blocks for additional retention, and to provide additional protection from water/mud ingress into any open or exposed portions of the vehicle.

Skateboard 510 may further include a power supply status indicator, specifically a battery indicator 604 comprising one or more illuminators (e.g., LEDs) disposed within a housing of the motor controller. Battery indicator 604 may include any suitable illuminator(s) configured to indicate a state of the power supply, e.g., by way of a signal provided to the battery indicator by the microcontroller and/or directly or indirectly from the power supply. Battery indicator 604 is viewable by a rider, e.g., during operation of the vehicle, through an aperture or slot 610 formed in an upper side of one of the foot pads. In this example, slot 610 is formed in second deck portion 518.

In this example, battery indicator 604 is an LED strip visible to the rider. The LED strip comprises a programmable array of RGB-capable lights configured to display a battery state of charge as a bar graph and/or by a color (e.g., starts green when fully charged, goes through yellow, to red when nearing full discharge). The LED strip may also flash error codes, display status of footpad zone activation (i.e., via a rider detection system), display alerts/alarms, blink code warnings, and/or the like. In some examples, LED behavior may be programmed to disappear while riding and only fade back in when stopped (or below a threshold speed). This mode of operation prevents the rider from looking down while riding. One or more of the above-described modes may be remotely selectable by a user. In some examples, the modes and, for example, a brightness adjustment, may be controllable from a software application running on a user's smartphone or other mobile device. In some examples, brightness may be based on either absolute brightness setting, or some other variable, e.g., a time of day adjustment (dimmer at night).

A tire pressure sensor 700 may be included in vehicle 510, and coupled electrically/electronically to a pressure valve 702 of tire 524. Tire pressure sensor 700 may include any suitable pressure sensor, e.g., integrated into tire 524, e.g., at the valve stem, configured to sense pneumatic pressure in tire 524 and to communicate that sensed pressure, e.g., wirelessly, to the motor controller and/or a networked device such as a user's mobile device (e.g., smart phone). A tire pressure management system may be employed either on-vehicle or as part of a software application running on the mobile device. The management system may function to log tire pressures, display or otherwise provide high- or low-pressure warnings or alerts, and/or communicate the tire pressure for further analysis and display.

Figure 17:
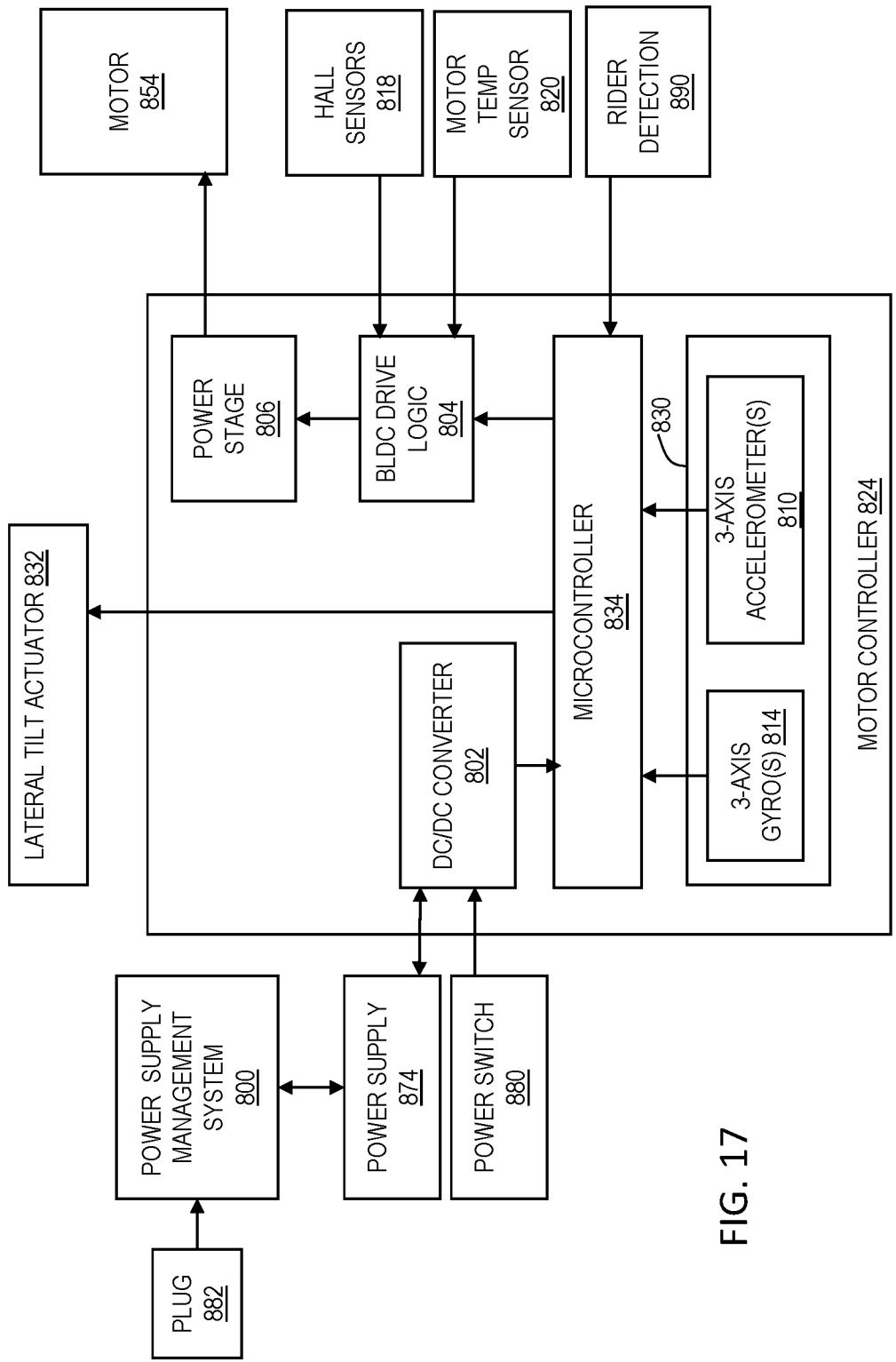
FIG. 17 is a schematic diagram depicting aspects of an illustrative electrical system of a self-stabilizing vehicle in accordance with aspects of the present teachings.

D. Illustrative Electrical System FIG. 17 depicts a block diagram of various illustrative electrical components of a self-balancing electrical vehicle, such as vehicle 100, vehicle 400, skateboard 510, and/or any other suitable vehicle. Some or all of the components depicted in FIG. 17 may be included in such a vehicle.

The electrical components may include a power supply management system 800, a direct current to direct current (DC/DC) converter 802, a brushless direct current (BLDC) drive logic 804, a power stage 806, one or more 3-axis accelerometers 810, one or more 3-axis gyros 814, one or more Hall sensors 818, and/or a motor temperature sensor 820. DC/DC converter 802, BLDC drive logic 804, and power stage 806 may be included in and/or coupled to a motor controller 824, which is an example of the motor controllers described in previous sections. In some examples, motor controller 824 may comprise a variable-frequency drive and/or any other suitable drive. Gyro(s) 814 and accelerometer(s) 810 are examples of sensors configured to sense pitch and roll orientation information, as described above. Gyro(s) 814 and accelerometer(s) 810 may comprise an orientation sensor assembly 830 disposed in any suitable location on the vehicle. In the depicted example, gyro 814 comprises a 3-axis gyro configured to sense orientation information about three axes (pitch, roll, and yaw). Similarly, accelerometer 810 comprises a 3-axis accelerometer configured to sense orientation information about pitch, roll, and yaw axes. In other examples, a sensor assembly includes a plurality of distinct gyros and/or accelerometers configured to sense the orientation information. In some examples, the sensor assembly is configured to sense orientation information about only one or two of the pitch, roll, and yaw axes.

In this example, sensor assembly 830 is included in motor controller 824, which also controls a lateral tilt actuator 832. In other examples, the sensor assembly and/or the lateral tilt actuator may be electrically coupled to the motor controller without being part of the motor controller. In some examples, the lateral tilt actuator is not in communication with the motor controller.

Active balancing (or self-stabilization) of an electric vehicle in the fore-aft direction (e.g., pitch stability) and in a lateral direction (e.g., roll stability) in accordance with aspects of the present teachings may be achieved through the use of one or more feedback control loop(s) or mechanism(s). The feedback control mechanism(s) includes orientation sensor assembly 830. Preferably, the feedback control mechanism includes a Proportional-Integral-Derivative (PID) control scheme using one or more gyros (e.g., gyro(s) 814) and one or more accelerometers (e.g., accelerometer(s) 810).

Alternatively, the electric vehicle may include any suitable sensor and feedback control loop configured to self-stabilize a vehicle, such as a 1-axis gyro configured to measure pivotation (i.e., pivoting) of the board about the pitch or roll axis, a 1-axis accelerometer configured to measure a gravity vector, and/or any other suitable feedback control loop, such as a closed-loop transfer function.

As mentioned above, orientation information of a frame of a vehicle may be measured (or sensed) by gyro 814 and accelerometer 810. The respective measurements (or sense signals) from gyro 814 and accelerometer 810 may be combined using a complementary or Kalman filter to estimate a lean angle of a vehicle frame (e.g., pivoting about the pitch, roll, and/or yaw axes) while filtering out the impacts of bumps, road texture and disturbances due to any steering inputs. For example, gyro 814 and accelerometer 810 may be connected to a microcontroller 834, which may be configured to correspondingly measure movement of a vehicle and/or vehicle frame about and/or along the pitch, roll, and/or yaw axes.

For example, lateral stabilization of the vehicle by controller 824 includes microcontroller 834 receiving from sensor assembly 830 orientation information indicating an orientation about the roll axis of a frame of the vehicle (e.g., a board of a skateboard, a cargo compartment of a robotic vehicle, and/or any other suitable frame coupled to the wheel axle by a linkage). Based on the sensed lateral orientation information, microcontroller 834 controls lateral tilt actuator 832 to tilt the frame of the vehicle about the roll axis in a manner that stabilizes the vehicle. For example, if the lateral orientation information meets certain criteria (e.g., criteria indicating that a center of gravity of the vehicle is disposed outboard or otherwise away from a contact patch between the wheel and the ground), microcontroller 834 causes tilt actuator 832 to tilt the vehicle frame in a manner that restores balance (e.g., that moves the center of gravity of the vehicle directly above the contact patch).

In some example, including the example depicted in FIG. 17, motor controller 824 is further configured to stabilize the vehicle in the fore-aft direction (i.e., about the pitch axis). Accordingly, a feedback control loop of controller 824 is configured to drive a motor 854 of the vehicle to achieve a predetermined target pitch angle of a frame of the vehicle with respect to the ground. The target pitch angle may be selected based on the type or modality of the vehicle. As an example, for a vehicle configured to be operated by a rider, the feedback control loop may be configured to drive a motor 854 of the vehicle to reduce a pitch angle of a frame of the vehicle with respect to the ground (i.e., to achieve a zero-degree target pitch angle). For example, if a rider were to angle the frame downward, so that a first portion of the frame was 'lower' than a second portion (e.g., if the rider pivoted board 512 counterclockwise (CCW) about axle 536 in FIG. 7), the feedback loop may drive motor 854 to cause CCW rotation of the tire about the pitch axis (i.e., axle 536) and a clockwise force on board 512). Thus, motion of the electric skateboard may be achieved by the rider leaning his or her weight toward a selected (e.g., "front") foot. Similarly, deceleration may be achieved by the rider leaning toward the other (e.g., "back") foot. Sustained operation may be achieved in either direction by the rider maintaining their lean toward either selected foot. In some examples, regenerative braking can be used to slow the vehicle.

Alternatively, the target pitch angle of the feedback control loop may be a nonzero angle. This would allow the vehicle to be moved forward while oriented at a zero-degree pitch.

For an autonomous vehicle having pitch stability, a feedback control loop may be configured to drive motor 854 to achieve a nonzero target angle of the vehicle frame with respect to the ground. This allows controller 824 to cause motor 854 to drive the vehicle forward while the vehicle is oriented upright. Accordingly, the autonomous vehicle need not be tilted forward in order to be propelled forward.

As another example, a feedback control loop for an autonomous or a non-autonomous vehicle may be configured to drive motor 854 in a manner that achieves a non-zero offset from a zero-degree target angle. This may simplify programming of microcontroller 834 and/or engineering of other aspects of controller 824 or of the vehicle, especially in examples wherein other aspects of the vehicle control system rely on or use a zero-degree pitch angle for reference.

In yet another example, a feedback control loop for an autonomous or a non-autonomous vehicle is configured to calculate a torque for motor 854 that would achieve a zero-degree pitch angle, and microcontroller 834 (or another portion of motor controller 824) is configured to command the motor to a torque equal to the calculated torque plus an additional torque factor. In other words, controller 824 determines the motor torque that would achieve a zero-degree pitch, and drives the motor at a somewhat greater torque. Accordingly, a vehicle presently oriented at zero degrees would be driven at a nonzero speed. This control algorithm can in some examples be implemented as a simple variation on a control scheme that drives the motor to achieve a zero-degree target angle. This may be convenient for, e.g., a vehicle that is selectively operable in either an autonomous or a non-autonomous mode.

As indicated in FIG. 17, microcontroller 834 may be configured to send a signal to brushless DC (BLDC) drive logic 804, which may communicate information relating to the orientation and motion of the vehicle frame. Fore-aft self-stabilization may be achieved by BLDC drive logic 804 interpreting the received signal and communicating with power stage 806 to drive motor 854 accordingly. Hall sensors 818 may send a signal to the BLDC drive logic to provide feedback regarding a substantially instantaneous rotational rate of the rotor of motor 854.

Motor temperature sensor 820 may be configured to measure a temperature of motor 854 and send this measured temperature to logic 804. Logic 804 may limit an amount of power supplied to motor 854 based on the measured temperature of motor 854 to prevent the motor from overheating. This overheating-prevention function may be implemented in vehicles having both fore-aft and lateral self-balancing capabilities, as well as in vehicles having only lateral self-balancing capabilities.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of the vehicle frame).

Alternatively or additionally, some embodiments may include neural network control, fuzzy control, genetic algorithm control, linear-quadratic regulator control, state-dependent Riccati equation control, and/or other control algorithms. In some embodiments, absolute or relative encoders may be incorporated to provide feedback on motor position. In some embodiments, a field-oriented control (FOC) or vector control system may be incorporated into the motor controller (e.g., in microcontroller 834, drive logic 804, and/or any other suitable processing logic of the motor controller).

With continued reference to FIG. 17, the various electrical components may be configured to manage a power supply 874. For example, power supply management system 800 may be a battery management system configured to protect batteries of power supply 874 from being overcharged, over-discharged, and/or short-circuited. Power supply management system 800 may monitor battery health, may monitor a state of charge in power supply 874, and/or may increase the safety of the vehicle. Power supply management system 800 may be connected between a charge plug receptacle 882 of the vehicle and power supply 874. A rider or other user may couple a charger to plug receptacle 882 and re-charge power supply 874 via system 800.

In operation, a power switch 880 may be activated by a user of the vehicle. Activation of switch 880 may send a power-on signal to converter 802. In response to the power-on signal, converter 802 may convert direct current from a first voltage level provided by power supply 874 to one or more other voltage levels. The other voltage levels may be different than the first voltage level. Converter 802 may be connected to the other electrical components via one or more electrical connections to provide these electrical components with suitable voltages.

In rider-operated vehicles (such as skateboard 510), a rider detection system 890 may be configured to support various vehicle functions. Once the rider has suitably positioned themselves on the board, the fore-aft stabilization control loop may be configured to not activate until the rider moves the vehicle to a predetermined orientation. For example, an algorithm may be incorporated into the feedback control loop, such that the control loop is not active (e.g., does not drive the motor) until the rider uses their weight to bring the vehicle frame (e.g., a skateboard deck) up to an approximately level orientation (e.g., zero degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

Upon activation of power switch 880, converter 802 (or other suitable circuitry) may transmit the power-on signal to microcontroller 834. In response to the power-on signal, microcontroller may initialize sensors 830, and rider detection device 890.

The electric vehicle may include one or more safety mechanisms, such as power switch 880 and/or rider detection device 890, to ensure that the rider is on the vehicle before engaging the feedback control loop. In some embodiments, rider detection device 890 may be configured to determine if the rider's feet are disposed on a foot deck, and to send a signal causing motor 854 to enter an active state when the rider's feet are determined to be disposed on the foot deck.

Rider detection device 890 may include any suitable mechanism, structure, or apparatus for determining whether the rider is on the electric vehicle. For example, device 890 may include one or more mechanical buttons, one or more capacitive sensors, one or more inductive sensors, one or more optical switches, one or more force-resistive sensors, and/or one or more strain gauges. In some embodiments, device 890 may include a hand-held "dead-man" switch.

In skateboard vehicle 510, rider detection device 890 may be located on or under either or both of first and second deck portions 516, 518. In some examples, the one or more mechanical buttons or other devices may be pressed directly (e.g., if on the deck portions), or indirectly (e.g., if under the deck portions), to sense whether the rider is on board 512. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board.

In general, if device 890 detects that the rider is suitably positioned on the electric vehicle, device 890 may send a rider-present signal to microcontroller 834. The rider-present signal may be the signal causing motor 854 to enter the active state. In response to the rider-present signal (and/or the board being moved to the level orientation), microcontroller 834 may activate the feedback control loop for driving motor 854. For example, in response to the rider-present signal, microcontroller 834 may send board orientation information (or measurement data) from sensors 830 to logic 804 for powering motor 854 via power stage 806.

In some embodiments, if device 890 detects that the rider is no longer suitably positioned or present on the electric vehicle, device 890 may send a rider-not-present signal to microcontroller 834. In response to the rider-not-present signal, circuitry of the vehicle (e.g., microcontroller 834, logic 804, and/or power stage 806) may be configured to reduce a rotational rate of the rotor relative to the stator to bring the vehicle to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 854 even though the rider may not be present on the vehicle (e.g., temporarily), which may allow the rider to perform various tricks. For example, device 890 may be configured to delay sending the rider-not-present signal to the microcontroller for a predetermined duration of time, and/or the microcontroller may be configured to delay sending the signal to logic 804 to cut power to the motor for a predetermined duration of time.

E. Illustrative Combinations and Additional Examples

This section describes additional aspects and features of one-wheeled vehicles, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A self-balancing electric vehicle comprising:
a wheel having an axle coupled to a body of the vehicle by a mechanical linkage, wherein the body of the vehicle is tiltable about a pitch axis coaxial with the axle of the wheel;
wherein the body of the vehicle is tiltable with respect to the wheel axle about a roll axis orthogonal to the pitch axis;
an actuator coupled to the mechanical linkage;
a hub motor configured to drive the wheel;
one or more orientation sensors coupled to the vehicle; and
a motor controller configured to receive, from the one or more orientation sensors, first orientation information indicating a pitch orientation of the body with respect to the pitch axis and second orientation information indicating a roll orientation of the body with respect to the roll axis, to cause the hub motor to propel the vehicle based on the first orientation information, and to cause the tilt actuator to adjust the orientation of the body based on the second orientation information.

A1. The vehicle of A0, wherein the motor controller is configured to maintain a selected balance angle of the body with respect to the pitch axis, wherein adjusting a balance angle offset parameter of the motor controller effectively causes the motor controller to attempt to maintain a different balance angle; and
wherein the balance angle offset parameter is controllable to cause the hub motor to propel the vehicle.

A2. The vehicle of A1, wherein the offset parameter is controllable remotely.

A3. The vehicle of A1, wherein the motor controller is configured to control the offset parameter automatically.

A3. The vehicle of any one of paragraphs A0 through A2, wherein the actuator comprises a linear actuator (e.g., a lead screw, a pneumatic cylinder, a hydraulic cylinder, and/or a worm gear).

A4. The vehicle of any one of paragraphs A0 through A3, wherein the actuator comprises a rotary actuator.

A5. The vehicle of any one of paragraphs A0 through A4, wherein the mechanical linkage comprises a strut having a first end coupled to the body and a second end coupled to the axle.

A6. The vehicle of A5, wherein the first end is coupled to the body by a pivoting joint.

A7. The vehicle of A5, wherein the second end is coupled to the axle by a pivoting joint.

A8. The vehicle of any one of paragraphs A0 through A7, wherein the mechanical linkage comprises a strut having a first end coupled to the body and a second end coupled to a frame connected to the axle.

A9. The vehicle of A8, wherein the frame extends laterally around the wheel.

A10. The vehicle of A8, wherein the first end is coupled to the body by a pivoting joint.

A11. The vehicle of A8, wherein the second end is coupled to the frame by a pivoting joint.

A12. The vehicle of any one of paragraphs A0 through A11, wherein the mechanical linkage comprises a four-bar linkage.

A13. The vehicle of A12, wherein the mechanical linkage comprises:
a strut extending between the body and the axle of the wheel;
a rod having a first end coupled either to the body or to a frame connected to the axle, the rod extending at least partially between the body and the frame;
an arm coupled to a rotary actuator and to a second end of the rod;
wherein rotation of the rotary actuator causes the rod to exert a tilting force on the body of the vehicle.

A14. The vehicle of A13, wherein the strut and the rotary actuator are fixed to the body, and the rod is pivotably coupled to the arm and to the frame.

A15. The vehicle of any one of paragraphs A0 through A14, wherein the body comprises a cargo compartment.

A16. The vehicle of any one of paragraphs A0 through A15, wherein the body comprises a board having first and second deck portions each configured to receive a left or a right foot of a rider oriented generally perpendicular to a direction of travel of the board.

A17. The vehicle of any one of paragraphs A0 through A16, wherein the wheel of the vehicle is the only wheel of the vehicle.

A18. The vehicle of any one of paragraphs A0 through A16, further comprising a second wheel, wherein the first wheel and the second wheel are coaxial.

F. Illustrative Stabilization Method

Figure 18:
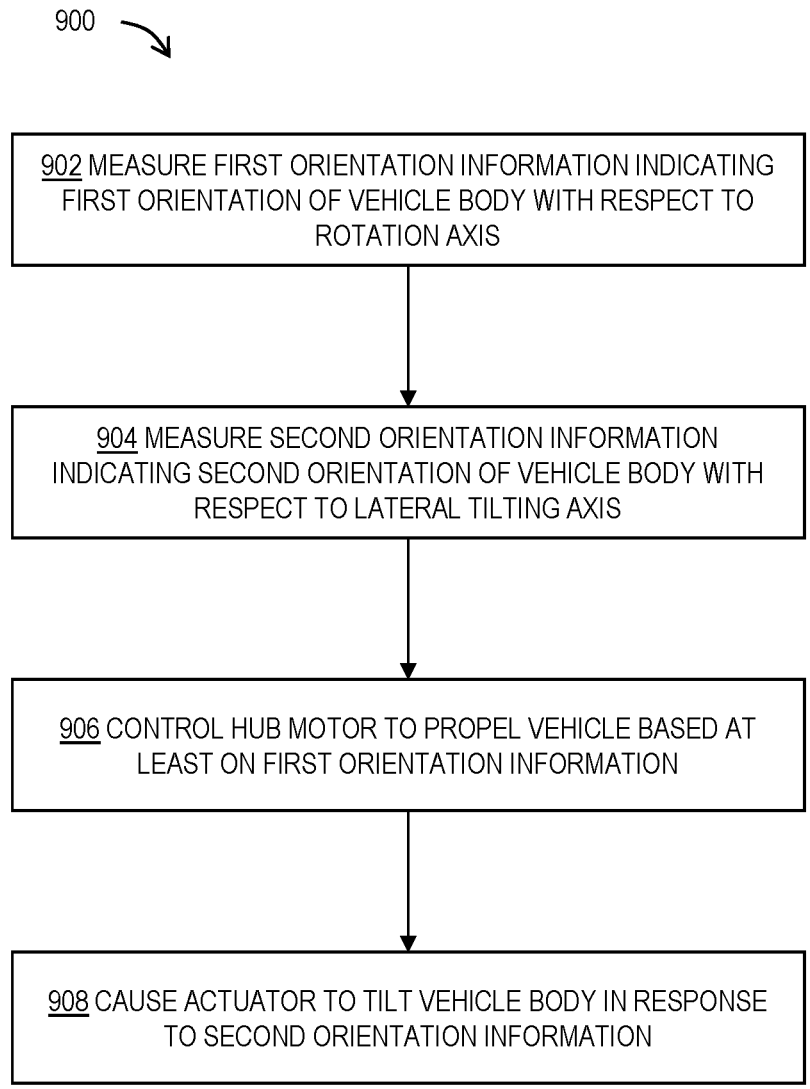
FIG. 18 is a flow diagram depicting steps of an illustrative method for stabilizing an electric vehicle in accordance with aspects of the present teachings.

This section describes steps of an illustrative method 900 for automatically stabilizing a single-wheeled electric vehicle; see FIG. 18. Aspects of vehicles described above (e.g., vehicle linkages, frames, control systems, and so on) may be utilized in the method steps described below. Where appropriate, reference may be made to components and systems that may be used in carrying out each step. These references are for illustration, and are not intended to limit the possible ways of carrying out any particular step of the method.

FIG. 18 is a flowchart illustrating steps performed in an illustrative method, and may not recite the complete process or all steps of the method. Although various steps of method 900 are described below and depicted in FIG. 18, the steps need not necessarily all be performed, and in some cases may be performed simultaneously or in a different order than the order shown.

At step 902, method 900 includes measuring first orientation information of a body of a vehicle (AKA a frame of the vehicle) indicating a first orientation of the body with respect to a rotation axis of a wheel of the vehicle. The body of the vehicle may comprise any suitable structure coupled to an axle of the wheel of the vehicle in a manner that permits the body to tilt relative to the axle about a roll axis (AKA a lateral tilt axis), described further below with reference to step 904. In some examples, measuring the first orientation information includes sensing a pitch angle using one or more gyros, accelerometers, and/or IMUs.

In some examples, the body of the vehicle comprises a cargo compartment. Alternatively, or additionally, the body may comprise a sensor payload, a display, a robot, a passenger support such as a seat or foot deck, and/or any other suitable devices.

At step 904, method 900 includes measuring second orientation information of the vehicle body indicating a second orientation of the body with respect to the lateral tilting axis. The lateral tilt axis is oriented orthogonal to the wheel-rotation axis, and the location of the roll axis relative to the vehicle depends on the specific linkage coupling the body to the axle. For example, in some embodiments, one or more pivoting joints coupling the body to the axle are disposed at a lateral side of the vehicle (e.g., near an end of the axle), and in some examples, the pivoting joint(s) is disposed at a fore or aft portion of the vehicle. Additionally, the pivoting joint(s) may be disposed at approximately the same height as the axle, or at a height above the height of the axle. In some examples, the linkage permits tilting in a generally lateral direction about more than one lateral axis.

At step 906, method 900 includes controlling a hub motor of the vehicle wheel, using a motor controller of the vehicle, to propel the vehicle based at least on the first orientation information. For example, the motor controller may include a microcontroller programmed to perform a feedback control loop configured to command the motor to propel the vehicle in a manner that tilts the vehicle about the rotation axis to a desired target pitch angle.

In some examples, the motor controller is configured to propel the vehicle based on the first orientation information and further based on a balance offset parameter. In this case, the motor controller implements a feedback control loop configured to propel the motor to tilt the vehicle to a pitch angle corresponding to a reference pitch plus the balance offset parameter. The reference pitch may be zero degrees.

At step 908, method 900 includes causing an actuator to tilt the vehicle body in response to the second orientation information. For example, step 908 may include controlling the actuator using an electronic controller, which may be the same device as the motor controller, may be part of the same device as the motor controller, or may be completely separate from the motor controller. The actuator may comprise any suitable actuator configured to tilt the vehicle body about a lateral tilt axis. The amount (e.g., angle) of tilt imparted to the vehicle body by the actuator may be determined based on any suitable criteria. For example, the vehicle body may be tilted laterally by an amount sufficient to position a center of gravity of the vehicle directly over a patch of contact between the vehicle (e.g., the wheel) and the ground. In some examples, a sufficient amount of tilt is calculated by the actuator controller. Alternatively, or additionally, the controller may be configured to tilt the vehicle body until it is determined (e.g., based on updated orientation information) that the vehicle is stable (e.g., that the center of gravity is above the contact patch).

The following describes additional aspects and features of methods for automatically stabilizing a single-wheeled electric vehicle, presented without limitation as a series of paragraphs:

B0. A method of balancing a vehicle having only a single wheel, the method comprising:

measuring first orientation information of a body of the vehicle indicating a pitch orientation of the body with respect to a rotation axis of the single wheel of the vehicle, wherein the body is coupled to the wheel by a mechanical linkage;

measuring second orientation information of the body indicating a roll orientation of the body with respect to a lateral tilting axis orthogonal to the rotation axis of the wheel;

controlling a motor coupled to the wheel to propel the vehicle based on the first orientation information; and using an actuator of the mechanical linkage to tilt the body in response to the second orientation information.

B1. The method of B0, wherein the motor comprises a hub motor.

B2. The method of B0 or B1, wherein the mechanical linkage is a four-bar linkage.

B3. The method of any one of paragraphs B0 through B2, wherein controlling the motor to propel the vehicle is further based on a balance offset, and the method further includes dynamically adjusting the balance offset.

B4. The method of any one of paragraphs B0 through B3, combined with any one or more aspects of method 900.

Advantages, Features, and Benefits

The different embodiments and examples of the one-wheeled vehicle described herein provide several advantages over known solutions. For example, illustrative embodiments and examples described herein allow a self-stabilizing and/or self-balancing vehicle having an extremely small footprint in terms of, e.g., an overall vehicle size and an area of the contact patch between the vehicle and the ground. Because the vehicle described herein is one-wheeled, it has a contact patch area much smaller than that of a multi-wheeled vehicle.

Additionally, and among other benefits, illustrative embodiments and examples described herein allow a one-wheeled vehicle having stabilization in both a fore-aft direction and a lateral direction. This stabilization allows the vehicle to have a smaller width than known vehicles, which typically rely on width for lateral stability. Additionally, or alternatively, stabilization in these two directions may allow increased safety for a one-wheeled vehicle having a rider. In some examples, effects of the lateral stabilization control system may be selectively disabled and/or attenuated. This allows the vehicle to be adjusted to the needs of a specific rider, specific operating conditions, and/or other situations.

Additionally, and among other benefits, illustrative embodiments and examples described herein allow a one-wheeled robotic vehicle (e.g., a one-wheeled vehicle capable of operating without a rider), which avoids certain problems encountered by multi-wheeled vehicles. For example, a multi-wheeled vehicle can lose stability when one or more of its wheels is on a lower-friction surface (e.g., wet grass, loose gravel, etc.) than one or more of its other wheels. This problem is avoided by a vehicle having only a single wheel, such as the vehicle of the present disclosure. The vehicle described herein therefore can have several advantages over known vehicles, including increased stability, increased off-road capability, and so on.

Additionally, and among other benefits, illustrative embodiments and examples described herein allow a vehicle having a pneumatic tire, allowing for increased passive shock absorption capabilities compared to vehicles having other types of tires.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A self-balancing electric vehicle comprising:
a wheel having an axle coupled to a body of the vehicle by a mechanical linkage, wherein the body of the vehicle is tiltable about a pitch axis coaxial with the axle of the wheel, wherein the wheel is the only wheel of the vehicle;
wherein the body of the vehicle is tiltable with respect to the wheel axle about a roll axis orthogonal to the pitch axis;
a tilt actuator coupled to the mechanical linkage;
a hub motor configured to drive the wheel;
one or more orientation sensors coupled to the vehicle; and
a motor controller configured to receive, from the one or more orientation sensors, first orientation information indicating a pitch orientation of the body with respect to the pitch axis and second orientation information indicating a roll orientation of the body with respect to the roll axis, to cause the hub motor to propel the vehicle based on the first orientation information, and to cause the tilt actuator to adjust the orientation of the body based on the second orientation information;
wherein the motor controller is further configured to steer the vehicle by causing the tilt actuator to tilt the body of the vehicle about the roll axis, such that the weight of the vehicle shifts over the roll axis.

2. The vehicle of claim 1, wherein the motor controller is configured to maintain a selected balance angle of the body with respect to the pitch axis, wherein adjusting a balance angle offset parameter of the motor controller effectively causes the motor controller to attempt to maintain a different balance angle; and
wherein the balance angle offset parameter is controllable to cause the hub motor to propel the vehicle.

3. The vehicle of claim 1, wherein the mechanical linkage comprises a strut having a first end coupled to the body and a second end coupled to the axle.

4. The vehicle of claim 3, wherein the first end is coupled to the body by a pivoting joint.

5. The vehicle of claim 3, wherein the second end is coupled to the axle by a pivoting joint.

6. The vehicle of claim 1, wherein the mechanical linkage comprises a strut having a first end coupled to the body and a second end coupled to a frame connected to the axle.

7. The vehicle of claim 6, wherein the frame extends laterally around the wheel.

8. The vehicle of claim 6, wherein the first end is coupled to the body by a pivoting joint.

9. The vehicle of claim 6, wherein the second end is coupled to the frame by a pivoting joint.

10. The vehicle of claim 1, wherein the tilt actuator comprises a rotary actuator, and the mechanical linkage is a four-bar linkage comprising:
a strut extending between the body and the axle of the wheel;
a rod having a first end coupled either to the body or to a frame connected to the axle, the rod extending at least partially between the body and the frame; and
an arm coupled to the rotary actuator and to a second end of the rod;
wherein rotation of the rotary actuator causes the rod to exert a tilting force on the body of the vehicle.

11. The vehicle of claim 10, wherein the strut and the rotary actuator are fixed to the body, and the rod is pivotably coupled to the arm and to the frame.

12. The vehicle of claim 1, wherein the body comprises a cargo compartment.

13. The vehicle of claim 1, wherein the body comprises a board having first and second deck portions each configured to receive a left or a right foot of a rider oriented generally perpendicular to a direction of travel of the board.

14. The vehicle of claim 1, wherein the tilt actuator comprises a linear actuator.

15. The vehicle of claim 1, wherein a first sensor is a multi-axis accelerometer configured to sense the first orientation information and the second orientation information.

* * * * *